(12) United States Patent
Dong et al.

(10) Patent No.: US 12,019,221 B2
(45) Date of Patent: Jun. 25, 2024

(54) OPTICAL IMAGING LENS INCLUDING EIGHT LENSES OF +−+−+−+−, +−+−+−++, +−++−−+−, OR +−+−−++− REFRACTIVE POWERS

(71) Applicant: Genius Electronic Optical (Xiamen) Co., Ltd., Fujian (CN)

(72) Inventors: Chuanbo Dong, Fujian (CN); Jiali Lian, Fujian (CN); Jiayuan Zhang, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 17/953,345

(22) Filed: Sep. 27, 2022

(65) Prior Publication Data
US 2023/0082632 A1   Mar. 16, 2023

Related U.S. Application Data

(63) Continuation of application No. 16/820,734, filed on Mar. 17, 2020, now Pat. No. 11,487,085.

(30) Foreign Application Priority Data

Dec. 20, 2019 (CN) .......................... 201911326343.6

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2019/0033557 A1*  1/2019  Chang ................ G02B 13/0045

FOREIGN PATENT DOCUMENTS

| CN | 107167898 A | * | 9/2017 | ......... G02B 13/0045 |
| CN | 108983399 A | * | 12/2018 | ......... G02B 13/0045 |

OTHER PUBLICATIONS

CN-108983399-A, translation (Year: 2018).*
CN-107167898-A, translation (Year: 2017).*

* cited by examiner

*Primary Examiner* — Wen Huang
(74) *Attorney, Agent, or Firm* — Winston Hsu

(57) ABSTRACT

An optical imaging lens includes a first lens element to an eighth lens element, and each lens element has an object-side surface and an image-side surface. The first lens element has positive refracting power, an optical axis region of the image-side surface of the first lens element is concave, the second lens element has negative refracting power, a periphery region of the object-side surface of the second lens element is concave, and an optical axis region of the object-side surface of the eighth lens element is convex. The lens elements having refracting power included by the optical imaging lens are only the eight lens elements described above. The optical imaging lens satisfies the following conditions: $D61t82/D21t42 \geq 1.750$.

20 Claims, 30 Drawing Sheets

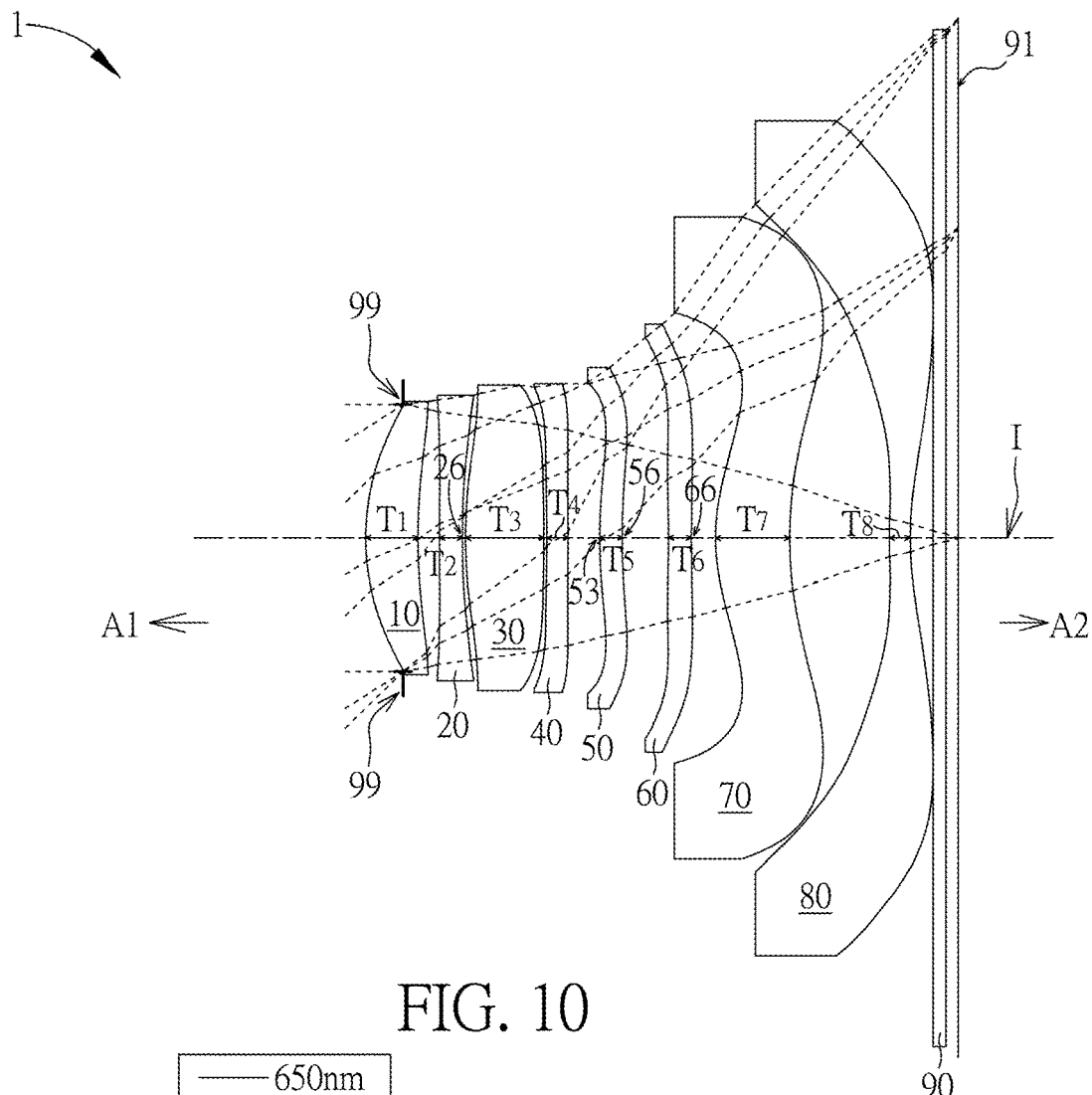
FIG. 10
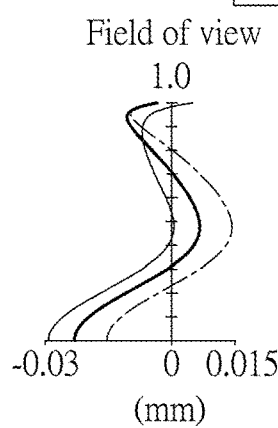
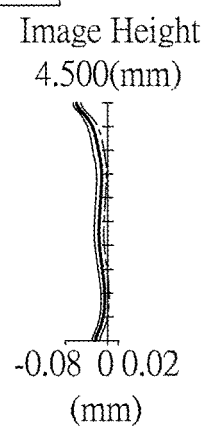
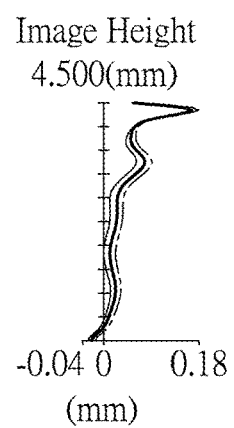
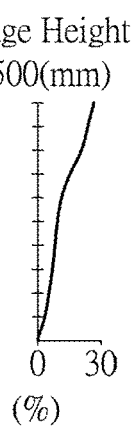
FIG. 11A   FIG. 11B   FIG. 11C   FIG. 11D

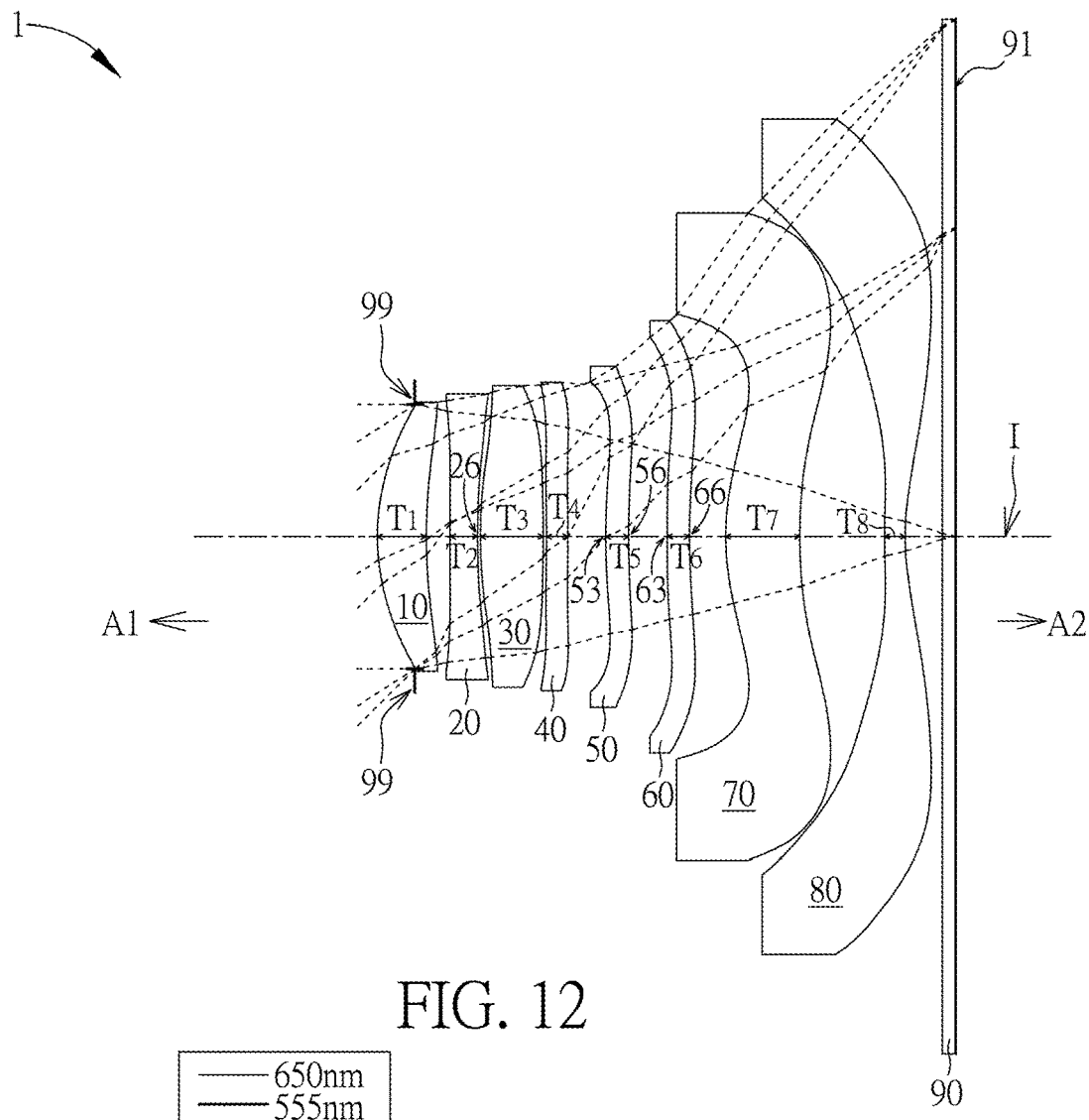
FIG. 12
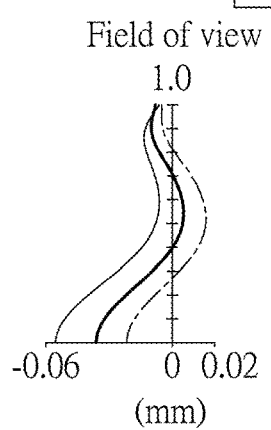
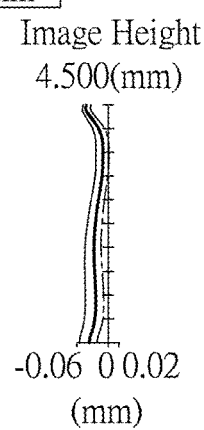
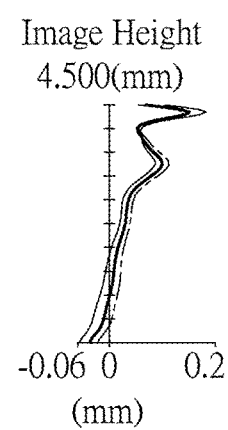
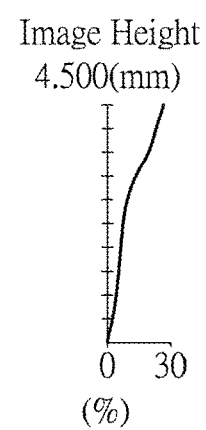
FIG. 13A   FIG. 13B   FIG. 13C   FIG. 13D Longitudinal spherical aberration Sagittal field curvature Tangential field curvature Distortion

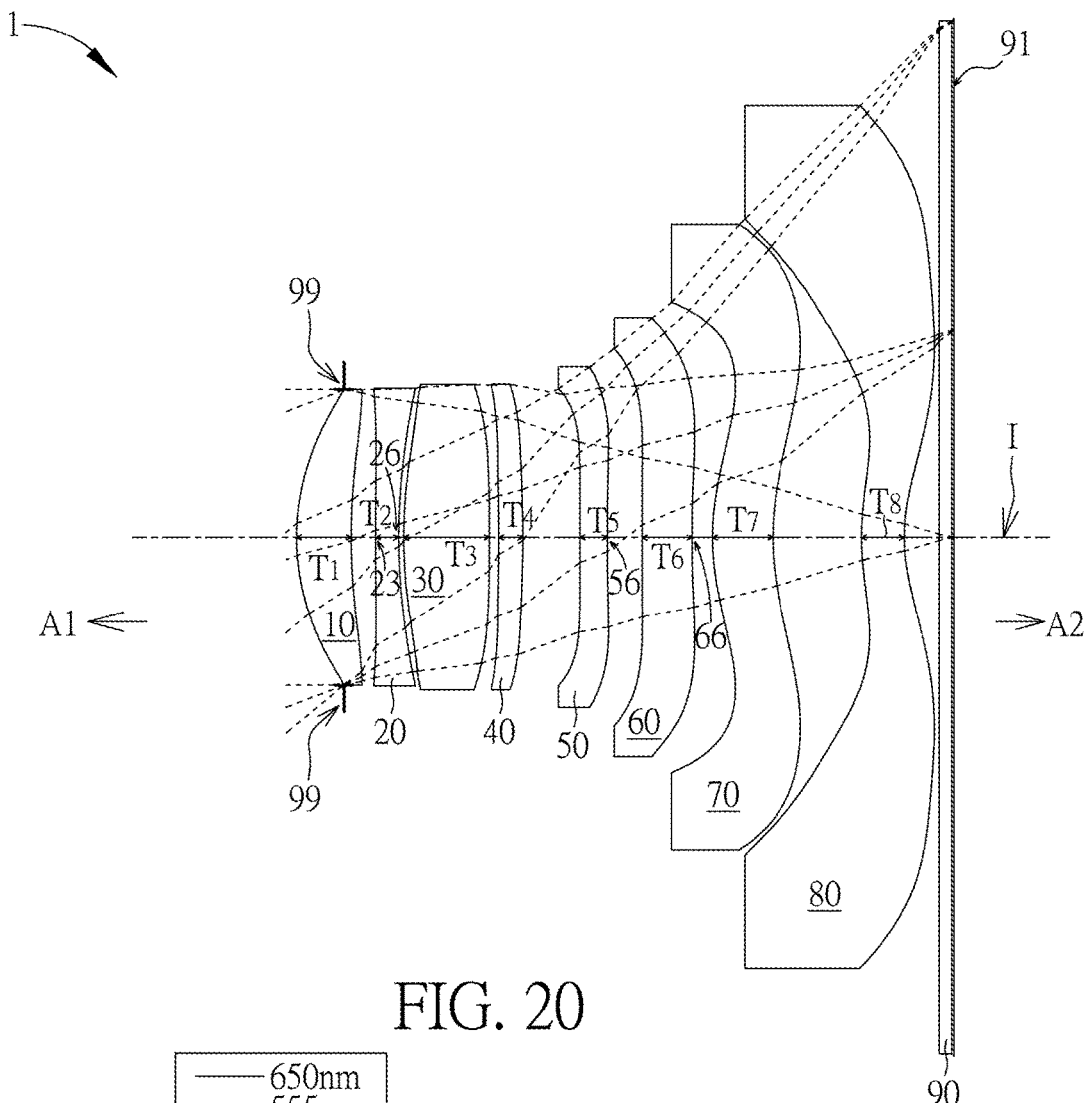
FIG. 20
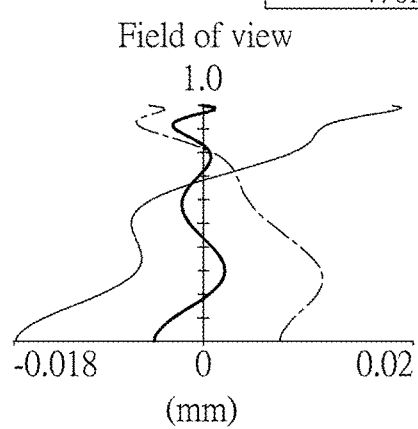
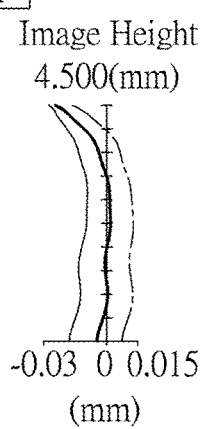
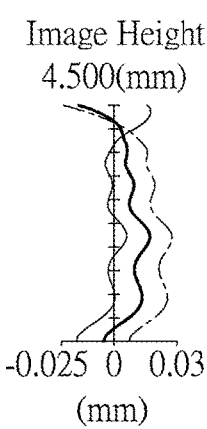
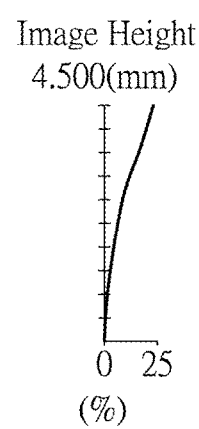
FIG. 21A  FIG. 21B  FIG. 21C  FIG. 21D

| First Example | | | | | | |
|---|---|---|---|---|---|---|
| EFL=4.792mm; HFOV=44.342degrees; TTL=5.670mm; Fno=1.690; ImgH=4.500mm | | | | | | |
| No. | Radius (mm) | Ape. Stop Distance Lens Thickness Air Gap (mm) | Material | Refractive Index | Abbe No. | Focal Length (mm) |
| Object | Infinity | Infinity | | | | |
| 99 Ape. Stop | Infinity | -0.454 | | | | |
| 11 First Lens | 2.116 | 0.507 | T1 Plastic | 1.545 | 55.987 | 7.092 |
| 12 | 4.266 | 0.268 | G12 | | | |
| 21 Second Lens | -40.983 | 0.194 | T2 Plastic | 1.661 | 20.373 | -66.883 |
| 22 | -503.857 | 0.031 | G23 | | | |
| 31 Third Lens | 8.923 | 0.606 | T3 Plastic | 1.545 | 55.987 | 6.554 |
| 32 | -5.837 | 0.025 | G34 | | | |
| 41 Fourth Lens | -7.088 | 0.225 | T4 Plastic | 1.661 | 20.373 | -12.178 |
| 42 | -56.289 | 0.455 | G45 | | | |
| 51 Fifth Lens | -64.104 | 0.222 | T5 Plastic | 1.661 | 20.373 | 15.795 |
| 52 | -9.062 | 0.248 | G56 | | | |
| 61 Sixth Lens | -2.799 | 0.264 | T6 Plastic | 1.545 | 55.987 | -5.742 |
| 62 | -26.875 | 0.164 | G67 | | | |
| 71 Seventh Lens | 1.669 | 0.353 | T7 Plastic | 1.545 | 55.987 | 5.008 |
| 72 | 3.957 | 1.217 | G78 | | | |
| 81 Eighth Lens | 6.902 | 0.362 | T8 Plastic | 1.545 | 55.987 | -3.573 |
| 82 | 1.494 | 0.324 | G8F | | | |
| 90 Filter | Infinity | 0.110 | | 1.517 | 64.167 | |
| | Infinity | 0.096 | | | | |
| 91 Image Plane | Infinity | 0.000 | | | | |

FIG. 24

| No. | K | $a_2$ | $a_4$ | $a_6$ | $a_8$ | $a_{10}$ |
|---|---|---|---|---|---|---|
| 11 | -7.309930E-01 | 0.000000E+00 | -4.843062E-03 | 3.718116E-02 | -5.895587E-02 | 4.778933E-02 |
| 12 | -3.080301E+01 | 0.000000E+00 | 4.147231E-02 | -2.165090E-02 | -1.324815E-02 | 1.004766E-02 |
| 21 | 8.102690E+02 | 0.000000E+00 | 3.991097E-02 | -3.708081E-02 | -2.613741E-02 | 4.848715E-02 |
| 22 | 1.001016E+03 | 0.000000E+00 | 1.321570E-01 | -1.756004E-01 | 7.138440E-02 | 2.753989E-02 |
| 31 | -1.733752E+01 | 0.000000E+00 | 9.716487E-02 | -1.799035E-01 | 1.303322E-01 | -5.920426E-02 |
| 32 | 9.550878E+00 | 0.000000E+00 | 1.559610E-01 | -3.149588E-01 | 2.726411E-01 | -1.349672E-01 |
| 41 | -3.701175E+01 | 0.000000E+00 | 1.940632E-01 | -3.614598E-01 | 3.357229E-01 | -1.871126E-01 |
| 42 | -4.998333E+02 | 0.000000E+00 | 7.589804E-02 | -1.235897E-01 | 1.261611E-01 | -8.606083E-02 |
| 51 | -1.674793E+02 | 0.000000E+00 | 1.145002E-01 | -2.666418E-01 | 2.387400E-01 | -1.339315E-01 |
| 52 | -2.701673E+02 | 0.000000E+00 | 1.776593E-01 | -3.319341E-01 | 2.777759E-01 | -1.457304E-01 |
| 61 | -5.776575E+01 | 0.000000E+00 | 7.804527E-02 | -1.873197E-01 | 1.613774E-01 | -9.217201E-02 |
| 62 | 2.360318E+02 | 0.000000E+00 | -7.551105E-02 | -1.884149E-02 | 3.193689E-02 | -1.946886E-02 |
| 71 | -1.205521E+01 | 0.000000E+00 | 5.890866E-02 | -5.353715E-02 | 2.051122E-02 | -6.601495E-03 |
| 72 | -9.772855E+01 | 0.000000E+00 | 1.159628E-01 | -7.212607E-02 | 2.092047E-02 | -3.823657E-03 |
| 81 | -3.893977E+02 | 0.000000E+00 | -1.637858E-01 | 6.713247E-02 | -1.580550E-02 | 2.153469E-03 |
| 82 | -1.383489E+01 | 0.000000E+00 | -3.325852E-02 | 8.675951E-03 | -1.332852E-03 | 1.275735E-04 |
| No. | $a_{12}$ | $a_{14}$ | $a_{16}$ | $a_{18}$ | $a_{20}$ | |
| 11 | -2.161741E-02 | 4.332732E-03 | -2.336771E-04 | | | |
| 12 | -2.579735E-03 | 4.385545E-04 | -3.414427E-05 | | | |
| 21 | -2.022328E-02 | 2.093505E-03 | 2.126145E-04 | | | |
| 22 | -2.722398E-02 | 6.278430E-03 | -4.898080E-04 | | | |
| 31 | 1.833237E-02 | -2.245432E-03 | -1.942193E-04 | | | |
| 32 | 3.918710E-02 | -5.845387E-03 | 3.284908E-04 | | | |
| 41 | 6.292699E-02 | -1.136132E-02 | 7.240682E-04 | | | |
| 42 | 3.293396E-02 | -5.974901E-03 | 2.144452E-04 | | | |
| 51 | 3.762214E-02 | -3.794796E-03 | -4.089233E-04 | | | |
| 52 | 4.356590E-02 | -6.669896E-03 | 4.305738E-04 | | | |
| 61 | 3.237916E-02 | -5.846599E-03 | 3.602783E-04 | | | |
| 62 | 6.235843E-03 | -8.623860E-04 | 6.927739E-06 | | | |
| 71 | 1.434917E-03 | -1.674657E-04 | 5.929998E-06 | | | |
| 72 | 4.195549E-04 | -2.355983E-05 | 1.907300E-07 | | | |
| 81 | -1.685850E-04 | 6.23109E-06 | -3.02763E-08 | | | |
| 82 | -9.090537E-06 | 4.51831E-07 | -1.07569E-08 | | | |

FIG. 25

| No. | | Radius (mm) | Ape. Stop Distance Lens Thickness Air Gap (mm) | Material | Refractive Index | Abbe No. | Focal Length (mm) |
|---|---|---|---|---|---|---|---|
| | \multicolumn{7}{c|}{Second Example} | | | | | | |
| | \multicolumn{7}{c|}{EFL=3.439mm; HFOV=44.560degrees; TTL=5.026mm; Fno=1.550; ImgH=4.500mm} | | | | | | |
| | Object | Infinity | Infinity | | | | |
| 99 | Ape. Stop | Infinity | -0.301 | | | | |
| 11 | First Lens | 2.063 | 0.431 | T1 Plastic | 1.545 | 55.987 | 5.900 |
| 12 | | 5.311 | 0.192 | G12 | | | |
| 21 | Second Lens | -44.594 | 0.174 | T2 Plastic | 1.661 | 20.373 | -14.045 |
| 22 | | 11.881 | 0.023 | G23 | | | |
| 31 | Third Lens | 5.443 | 0.424 | T3 Plastic | 1.545 | 55.987 | 6.322 |
| 32 | | -9.189 | 0.031 | G34 | | | |
| 41 | Fourth Lens | -8.059 | 0.149 | T4 Plastic | 1.661 | 20.373 | -17.262 |
| 42 | | -27.046 | 0.362 | G45 | | | |
| 51 | Fifth Lens | 6.919 | 0.205 | T5 Plastic | 1.661 | 20.373 | 21.126 |
| 52 | | 13.431 | 0.291 | G56 | | | |
| 61 | Sixth Lens | -6.165 | 0.243 | T6 Plastic | 1.545 | 55.987 | -6.685 |
| 62 | | 9.085 | 0.355 | G67 | | | |
| 71 | Seventh Lens | 2.126 | 0.788 | T7 Plastic | 1.545 | 55.987 | 7.545 |
| 72 | | 3.817 | 0.832 | G78 | | | |
| 81 | Eighth Lens | 1.260 | 0.182 | T8 Plastic | 1.545 | 55.987 | 3.462 |
| 82 | | 3.583 | 0.200 | G8F | | | |
| 90 | Filter | Infinity | 0.110 | | 1.517 | 64.167 | |
| | | Infinity | 0.033 | | | | |
| 91 | Image Plane | Infinity | 0.000 | | | | |

FIG. 26

| No. | K | $a_2$ | $a_4$ | $a_6$ | $a_8$ | $a_{10}$ |
|---|---|---|---|---|---|---|
| 11 | -7.768115E-01 | 0.000000E+00 | -7.520088E-03 | 4.131951E-02 | -6.128572E-02 | 4.845155E-02 |
| 12 | -7.368095E+01 | 0.000000E+00 | 4.251675E-02 | -2.955644E-02 | -1.173032E-02 | 1.177289E-02 |
| 21 | 1.233911E+03 | 0.000000E+00 | 3.774948E-02 | -4.361855E-02 | -2.755313E-02 | 4.973725E-02 |
| 22 | 3.361433E+01 | 0.000000E+00 | 1.302088E-01 | -1.857467E-01 | 7.094008E-02 | 2.805041E-02 |
| 31 | -2.605164E+01 | 0.000000E+00 | 1.060043E-01 | -1.814311E-01 | 1.267432E-01 | -6.026988E-02 |
| 32 | 3.073987E+01 | 0.000000E+00 | 1.506882E-01 | -3.188421E-01 | 2.742628E-01 | -1.353163E-01 |
| 41 | -6.086933E+01 | 0.000000E+00 | 2.058004E-01 | -3.630986E-01 | 3.301833E-01 | -1.880449E-01 |
| 42 | 2.309076E+02 | 0.000000E+00 | 8.237167E-02 | -1.220792E-01 | 1.224719E-01 | -8.882914E-02 |
| 51 | -9.558375E+01 | 0.000000E+00 | 1.025708E-01 | -2.629580E-01 | 2.457656E-01 | -1.338362E-01 |
| 52 | -4.036999E+01 | 0.000000E+00 | 1.445534E-01 | -3.179748E-01 | 2.813082E-01 | -1.472125E-01 |
| 61 | -2.553095E+38 | 0.000000E+00 | 1.327371E-01 | -1.882763E-01 | 1.573032E-01 | -9.319331E-02 |
| 62 | 3.244387E+00 | 0.000000E+00 | -1.650249E-02 | -2.441127E-02 | 2.967032E-02 | -1.982050E-02 |
| 71 | -1.115480E+01 | 0.000000E+00 | 4.792854E-02 | -5.909956E-02 | 2.244984E-02 | -7.050734E-03 |
| 72 | -6.844021E+01 | 0.000000E+00 | 1.064777E-01 | -6.897247E-02 | 2.123618E-02 | -3.838905E-03 |
| 81 | -1.242517E+03 | 0.000000E+00 | -1.263816E-01 | 6.333793E-02 | -1.602761E-02 | 2.188467E-03 |
| 82 | -1.100032E+01 | 0.000000E+00 | -3.345897E-02 | 8.919342E-03 | -1.422220E-03 | 1.297241E-04 |
| No. | $a_{12}$ | $a_{14}$ | $a_{16}$ | $a_{18}$ | $a_{20}$ | |
| 11 | -2.180008E-02 | 4.110941E-03 | -1.248090E-04 | | | |
| 12 | -2.407591E-03 | 1.608102E-04 | -3.381830E-05 | | | |
| 21 | -1.929011E-02 | 2.179142E-03 | -1.552506E-04 | | | |
| 22 | -2.735861E-02 | 6.456194E-03 | -3.588156E-04 | | | |
| 31 | 1.887594E-02 | -1.803820E-03 | -5.575511E-05 | | | |
| 32 | 3.866409E-02 | -6.198041E-03 | 5.477001E-04 | | | |
| 41 | 6.332289E-02 | -1.107647E-02 | 7.186280E-04 | | | |
| 42 | 3.317540E-02 | -5.648721E-03 | 2.939661E-04 | | | |
| 51 | 3.676999E-02 | -4.362081E-03 | -6.861099E-05 | | | |
| 52 | 4.324733E-02 | -6.504887E-03 | 5.110861E-04 | | | |
| 61 | 3.246183E-02 | -5.741916E-03 | 3.969847E-04 | | | |
| 62 | 6.235155E-03 | -8.319377E-04 | 3.240245E-05 | | | |
| 71 | 1.558292E-03 | -1.656607E-04 | -1.335176E-06 | | | |
| 72 | 4.033074E-04 | -2.241418E-05 | 4.860699E-07 | | | |
| 81 | -1.632698E-04 | 6.35753E-06 | -1.10658E-07 | | | |
| 82 | -8.538601E-06 | 4.41906E-07 | -1.15804E-08 | | | |

FIG. 27

| Third Example |||||||| 
|---|---|---|---|---|---|---|---|
| EFL=3.597mm; HFOV=44.483degrees; TTL=5.147mm; Fno=1.550; ImgH=4.500mm ||||||||
| No. | | Radius (mm) | Ape. Stop Distance Lens Thickness Air Gap (mm) | Material | Refractive Index | Abbe No. | Focal Length (mm) |
| | Object | Infinity | Infinity | | | | |
| 99 | Ape. Stop | Infinity | -0.326 | | | | |
| 11 | First Lens | 2.065 | 0.456 | T1 | Plastic | 1.545 | 55.987 | 5.896 |
| 12 | | 5.306 | 0.189 | G12 | | | | |
| 21 | Second Lens | -40.600 | 0.197 | T2 | Plastic | 1.661 | 20.373 | -13.869 |
| 22 | | 12.006 | 0.029 | G23 | | | | |
| 31 | Third Lens | 5.289 | 0.674 | T3 | Plastic | 1.545 | 55.987 | 6.438 |
| 32 | | -10.020 | 0.026 | G34 | | | | |
| 41 | Fourth Lens | -7.822 | 0.184 | T4 | Plastic | 1.661 | 20.401 | -19.064 |
| 42 | | -20.551 | 0.277 | G45 | | | | |
| 51 | Fifth Lens | 5.288 | 0.196 | T5 | Plastic | 1.531 | 49.620 | 20.725 |
| 52 | | 10.008 | 0.402 | G56 | | | | |
| 61 | Sixth Lens | -6.808 | 0.200 | T6 | Plastic | 1.545 | 55.987 | -9.269 |
| 62 | | 19.962 | 0.209 | G67 | | | | |
| 71 | Seventh Lens | 1.703 | 0.640 | T7 | Plastic | 1.545 | 55.987 | 5.343 |
| 72 | | 3.548 | 0.866 | G78 | | | | |
| 81 | Eighth Lens | 4.145 | 0.182 | T8 | Plastic | 1.545 | 55.987 | -19.851 |
| 82 | | 2.952 | 0.200 | G8F | | | | |
| 90 | Filter | Infinity | 0.110 | | | 1.517 | 64.167 | |
| | | Infinity | 0.108 | | | | | |
| 91 | Image Plane | Infinity | 0.000 | | | | | |

FIG. 28

| No. | K | $a_2$ | $a_4$ | $a_6$ | $a_8$ | $a_{10}$ |
|---|---|---|---|---|---|---|
| 11 | -7.734477E-01 | 0.000000E+00 | -7.357365E-03 | 4.046577E-02 | -6.043636E-02 | 4.867267E-02 |
| 12 | -6.731825E+01 | 0.000000E+00 | 4.119577E-02 | -2.851750E-02 | -1.139869E-02 | 1.153233E-02 |
| 21 | 1.001655E+03 | 0.000000E+00 | 4.419096E-02 | -4.392719E-02 | -2.753335E-02 | 4.992452E-02 |
| 22 | 3.145184E+01 | 0.000000E+00 | 1.286139E-01 | -1.848816E-01 | 7.135396E-02 | 2.829562E-02 |
| 31 | -3.094684E+01 | 0.000000E+00 | 1.057570E-01 | -1.794674E-01 | 1.283788E-01 | -5.975449E-02 |
| 32 | 3.895678E+01 | 0.000000E+00 | 1.516396E-01 | -3.200836E-01 | 2.732462E-01 | -1.355990E-01 |
| 41 | -6.778294E+01 | 0.000000E+00 | 1.986319E-01 | -3.652797E-01 | 3.298286E-01 | -1.882213E-01 |
| 42 | 1.128995E+02 | 0.000000E+00 | 8.072232E-02 | -1.208118E-01 | 1.237750E-01 | -8.819390E-02 |
| 51 | -3.082241E+01 | 0.000000E+00 | 9.057190E-02 | -2.619130E-01 | 2.463558E-01 | -1.342806E-01 |
| 52 | -3.986092E+01 | 0.000000E+00 | 1.414193E-01 | -3.196265E-01 | 2.808306E-01 | -1.473877E-01 |
| 61 | -2.417621E+02 | 0.000000E+00 | 1.344109E-01 | -1.870658E-01 | 1.572681E-01 | -9.330444E-02 |
| 62 | 2.935179E+01 | 0.000000E+00 | -1.468130E-02 | -2.441023E-02 | 2.960538E-02 | -1.982631E-02 |
| 71 | -1.155278E+01 | 0.000000E+00 | 4.724943E-02 | -5.949662E-02 | 2.240291E-02 | -7.124721E-03 |
| 72 | -6.393297E+01 | 0.000000E+00 | 1.044128E-01 | -6.885378E-02 | 2.123090E-02 | -3.843490E-03 |
| 81 | -1.004589E+03 | 0.000000E+00 | -1.295362E-01 | 6.335161E-02 | -1.605596E-02 | 2.187178E-03 |
| 82 | -9.567384E+00 | 0.000000E+00 | -3.331849E-02 | 8.960606E-03 | -1.424133E-03 | 1.290088E-04 |
| No. | $a_{12}$ | $a_{14}$ | $a_{16}$ | $a_{18}$ | $a_{20}$ | |
| 11 | -2.196335E-02 | 3.971566E-03 | -1.019179E-04 | | | |
| 12 | -2.663074E-03 | 8.011058E-05 | 3.296828E-05 | | | |
| 21 | -1.913179E-02 | 2.264530E-03 | -1.571350E-04 | | | |
| 22 | -2.721132E-02 | 6.451446E-03 | -5.375990E-04 | | | |
| 31 | 1.867566E-02 | -2.198831E-03 | -3.399335E-04 | | | |
| 32 | 3.859612E-02 | -6.303680E-03 | 3.769327E-04 | | | |
| 41 | 6.321245E-02 | -1.114250E-02 | 6.557330E-04 | | | |
| 42 | 3.329356E-02 | -5.709457E-03 | 2.537761E-04 | | | |
| 51 | 3.644488E-02 | -4.440374E-03 | -3.153818E-05 | | | |
| 52 | 4.314638E-02 | -6.551190E-03 | 5.015084E-04 | | | |
| 61 | 3.242813E-02 | -5.747931E-03 | 3.958623E-04 | | | |
| 62 | 6.234936E-03 | -8.320852E-04 | 3.243529E-05 | | | |
| 71 | 1.573430E-03 | -1.584931E-04 | -3.371176E-06 | | | |
| 72 | 4.033961E-04 | -2.236282E-05 | 4.687533E-07 | | | |
| 81 | -1.632132E-04 | 6.37664E-06 | -1.07706E-07 | | | |
| 82 | -8.581897E-06 | 4.4298E-07 | -1.12812E-08 | | | |

FIG. 29

| Fourth Example ||||||||
|---|---|---|---|---|---|---|---|
| EFL=3.564mm; HFOV=44.603degrees; TTL=5.033mm; Fno=1.550; ImgH=4.500mm ||||||||
| No. | | Radius (mm) | Ape. Stop Distance Lens Thickness Air Gap (mm) | Material | Refractive Index | Abbe No. | Focal Length (mm) |
| | Object | Infinity | Infinity | | | | |
| 99 | Ape. Stop | Infinity | -0.326 | | | | |
| 11 | First Lens | 2.043 | 0.426 | T1 Plastic | 1.545 | 55.987 | 6.008 |
| 12 | | 5.013 | 0.208 | G12 | | | |
| 21 | Second Lens | -44.457 | 0.238 | T2 Plastic | 1.661 | 20.373 | -13.798 |
| 22 | | 11.634 | 0.025 | G23 | | | |
| 31 | Third Lens | 5.057 | 0.541 | T3 Plastic | 1.545 | 55.987 | 5.975 |
| 32 | | -8.860 | 0.028 | G34 | | | |
| 41 | Fourth Lens | -7.958 | 0.186 | T4 Plastic | 1.582 | 30.186 | -22.081 |
| 42 | | -20.849 | 0.332 | G45 | | | |
| 51 | Fifth Lens | 7.667 | 0.200 | T5 Plastic | 1.661 | 20.373 | 18.913 |
| 52 | | 19.335 | 0.335 | G56 | | | |
| 61 | Sixth Lens | 158.039 | 0.194 | T6 Plastic | 1.545 | 55.987 | -13.292 |
| 62 | | 6.939 | 0.314 | G67 | | | |
| 71 | Seventh Lens | 2.169 | 0.641 | T7 Plastic | 1.545 | 55.987 | 6.772 |
| 72 | | 4.696 | 0.739 | G78 | | | |
| 81 | Eighth Lens | 4.540 | 0.180 | T8 Plastic | 1.545 | 55.987 | -9.315 |
| 82 | | 2.366 | 0.324 | G8F | | | |
| 90 | Filter | Infinity | 0.110 | | 1.517 | 64.167 | |
| | | Infinity | 0.010 | | | | |
| 91 | Image Plane | Infinity | 0.000 | | | | |

FIG. 30

| No. | K | $a_2$ | $a_4$ | $a_6$ | $a_8$ | $a_{10}$ |
|---|---|---|---|---|---|---|
| 11 | -7.848912E-01 | 0.000000E+00 | -7.737964E-03 | 4.195348E-02 | -6.169495E-02 | 4.825399E-02 |
| 12 | -5.914221E+01 | 0.000000E+00 | 4.579501E-02 | -2.986172E-02 | -1.245731E-02 | 1.155964E-02 |
| 21 | 1.094014E+03 | 0.000000E+00 | 3.771022E-02 | -4.303726E-02 | -2.806436E-02 | 4.905451E-02 |
| 22 | 2.350671E+01 | 0.000000E+00 | 1.292988E-01 | -1.867460E-01 | 7.048711E-02 | 2.784031E-02 |
| 31 | -2.300761E+01 | 0.000000E+00 | 1.053199E-01 | -1.822732E-01 | 1.263298E-01 | -6.040362E-02 |
| 32 | 3.245511E+01 | 0.000000E+00 | 1.479377E-01 | -3.189012E-01 | 2.740991E-01 | -1.354656E-01 |
| 41 | -1.325526E+02 | 0.000000E+00 | 2.055444E-01 | -3.636464E-01 | 3.300962E-01 | -1.880119E-01 |
| 42 | -8.217677E+01 | 0.000000E+00 | 8.604514E-02 | -1.218298E-01 | 1.221828E-01 | -8.899854E-02 |
| 51 | -7.623748E+01 | 0.000000E+00 | 9.875070E-02 | -2.639653E-01 | 2.455322E-01 | -1.339949E-01 |
| 52 | -9.290602E+01 | 0.000000E+00 | 1.440081E-01 | -3.180276E-01 | 2.811667E-01 | -1.473171E-01 |
| 61 | 7.877583E+03 | 0.000000E+00 | 1.309682E-01 | -1.879800E-01 | 1.573468E-01 | -9.321907E-02 |
| 62 | 2.516070E+00 | 0.000000E+00 | -1.613421E-02 | -2.504532E-02 | 2.952851E-02 | -1.984972E-02 |
| 71 | -1.201808E+01 | 0.000000E+00 | 4.625344E-02 | -5.899120E-02 | 2.226432E-02 | -7.048396E-03 |
| 72 | -9.650182E+01 | 0.000000E+00 | 1.061689E-01 | -6.890149E-02 | 2.122716E-02 | -3.842452E-03 |
| 81 | -8.731389E+02 | 0.000000E+00 | -1.241306E-01 | 6.300982E-02 | -1.606498E-02 | 2.187674E-03 |
| 82 | -1.165615E+01 | 0.000000E+00 | -3.186556E-02 | 8.892081E-03 | -1.429148E-03 | 1.293134E-04 |
| No. | $a_{12}$ | $a_{14}$ | $a_{16}$ | $a_{18}$ | $a_{20}$ | |
| 11 | -2.169159E-02 | 4.255799E-03 | -1.472122E-04 | | | |
| 12 | -2.323732E-03 | 2.654763E-04 | -5.838326E-05 | | | |
| 21 | -1.966011E-02 | 2.160237E-03 | 6.370633E-05 | | | |
| 22 | -2.742982E-02 | 6.477481E-03 | -2.712128E-04 | | | |
| 31 | 1.885094E-02 | -1.807931E-03 | -7.486515E-05 | | | |
| 32 | 3.864115E-02 | -6.142438E-03 | 6.188109E-04 | | | |
| 41 | 6.334935E-02 | -1.104672E-02 | 7.696541E-04 | | | |
| 42 | 3.314329E-02 | -5.638732E-03 | 2.908166E-04 | | | |
| 51 | 3.665040E-02 | -4.434102E-03 | -1.027648E-04 | | | |
| 52 | 4.318285E-02 | -6.543075E-03 | 4.891294E-04 | | | |
| 61 | 3.243891E-02 | -5.753436E-03 | 3.922730E-04 | | | |
| 62 | 6.230405E-03 | -8.323800E-04 | 3.246948E-05 | | | |
| 71 | 1.569514E-03 | -1.690289E-04 | -4.113831E-06 | | | |
| 72 | 4.030453E-04 | -2.242602E-05 | 4.821557E-07 | | | |
| 81 | -1.631597E-04 | 6.37565E-06 | -1.0864E-07 | | | |
| 82 | -8.545978E-06 | 4.43121E-07 | -1.1486E-08 | | | |

FIG. 31

| Fifth Example |||||||
|---|---|---|---|---|---|---|
| EFL=4.552mm; HFOV=39.306degrees; TTL=5.743mm; Fno=1.700; ImgH=4.500mm |||||||
| No. | Radius (mm) | Ape. Stop Distance Lens Thickness Air Gap (mm) | Material | Refractive Index | Abbe No. | Focal Length (mm) |
| Object | Infinity | Infinity | | | | |
| 99 Ape. Stop | Infinity | -0.443 | | | | |
| 11 First Lens | 2.087 | 0.461 | T1 Plastic | 1.545 | 55.987 | 6.393 |
| 12 | 4.778 | 0.408 | G12 | | | |
| 21 Second Lens | 29.247 | 0.200 | T2 Plastic | 1.661 | 20.373 | -15.874 |
| 22 | 7.753 | 0.031 | G23 | | | |
| 31 Third Lens | 4.962 | 0.515 | T3 Plastic | 1.545 | 55.987 | 6.002 |
| 32 | -9.311 | 0.096 | G34 | | | |
| 41 Fourth Lens | -10.349 | 0.221 | T4 Plastic | 1.661 | 20.373 | -15.315 |
| 42 | 807.128 | 0.337 | G45 | | | |
| 51 Fifth Lens | 8.620 | 0.289 | T5 Plastic | 1.661 | 20.373 | 13.860 |
| 52 | 125.601 | 0.248 | G56 | | | |
| 61 Sixth Lens | -7.989 | 0.430 | T6 Plastic | 1.545 | 55.987 | -9.095 |
| 62 | 13.391 | 0.212 | G67 | | | |
| 71 Seventh Lens | 3.527 | 0.520 | T7 Plastic | 1.545 | 55.987 | 8.156 |
| 72 | 16.032 | 0.224 | G78 | | | |
| 81 Eighth Lens | 2.478 | 0.476 | T8 Plastic | 1.545 | 55.987 | -6.406 |
| 82 | 1.352 | 0.500 | G8F | | | |
| 90 Filter | Infinity | 0.110 | | 1.517 | 64.167 | |
| | Infinity | 0.465 | | | | |
| 91 Image Plane | Infinity | 0.000 | | | | |

FIG. 32

| No. | K | $a_2$ | $a_4$ | $a_6$ | $a_8$ | $a_{10}$ |
|---|---|---|---|---|---|---|
| 11 | -7.614487E-01 | 0.000000E+00 | 5.764484E-03 | 6.139913E-03 | -1.524559E-02 | 1.397543E-02 |
| 12 | -2.928358E+01 | 0.000000E+00 | 3.296115E-02 | -2.735240E-02 | 6.212976E-03 | 5.668369E-04 |
| 21 | -1.739719E+00 | 0.000000E+00 | 4.097080E-02 | -8.432504E-02 | 7.109409E-02 | -6.111649E-02 |
| 22 | 2.501493E+01 | 0.000000E+00 | 1.443263E-01 | -2.977318E-01 | 3.550456E-01 | -3.209675E-01 |
| 31 | -8.040174E+00 | 0.000000E+00 | 1.149555E-01 | -2.570144E-01 | 3.221425E-01 | -2.892132E-01 |
| 32 | 3.698820E+01 | 0.000000E+00 | 1.085300E-01 | -2.337211E-01 | 2.087513E-01 | -1.271182E-01 |
| 41 | -5.084245E+01 | 0.000000E+00 | 2.107325E-01 | -3.599011E-01 | 3.331137E-01 | -2.167543E-01 |
| 42 | 0.000000E+00 | 0.000000E+00 | 1.249660E-01 | -2.272772E-01 | 2.406742E-01 | -1.889578E-01 |
| 51 | -6.327764E+01 | 0.000000E+00 | 6.214126E-02 | -1.817660E-01 | 1.791910E-01 | -1.325900E-01 |
| 52 | -1.189008E-02 | 0.000000E+00 | 1.088701E-01 | -2.131558E-01 | 1.639151E-01 | -9.250283E-02 |
| 61 | 0.000000E+00 | 0.000000E+00 | 1.039984E-01 | -1.148085E-01 | 3.916638E-02 | -5.375590E-03 |
| 62 | 2.038447E+01 | 0.000000E+00 | -2.477070E-02 | 7.335925E-03 | -2.331874E-02 | 1.749037E-02 |
| 71 | -1.131552E+01 | 0.000000E+00 | 2.197316E-02 | -2.992319E-02 | -7.548465E-03 | 1.006810E-02 |
| 72 | -2.125554E+00 | 0.000000E+00 | 1.155413E-01 | -9.347446E-02 | 3.423416E-02 | -7.005633E-03 |
| 81 | -1.740352E+01 | 0.000000E+00 | -1.007292E-02 | -5.286455E-02 | 3.289628E-02 | -8.622395E-03 |
| 82 | -4.342160E+00 | 0.000000E+00 | -5.231260E-02 | 1.000963E-02 | -8.415218E-04 | -1.865355E-05 |
| No. | $a_{12}$ | $a_{14}$ | $a_{16}$ | $a_{18}$ | $a_{20}$ | |
| 11 | -8.051485E-03 | 1.893646E-03 | -1.116913E-04 | | | |
| 12 | -3.555801E-03 | 2.139192E-03 | -3.599843E-04 | | | |
| 21 | 4.585243E-02 | -1.876835E-02 | 2.960510E-03 | | | |
| 22 | 1.955945E-01 | -6.631522E-02 | 9.192520E-03 | | | |
| 31 | 1.606994E-01 | -4.802495E-02 | 6.069131E-03 | | | |
| 32 | 5.476013E-02 | -1.554571E-02 | 2.324693E-03 | | | |
| 41 | 1.002941E-01 | -2.953808E-02 | 4.061910E-03 | | | |
| 42 | 1.006146E-01 | -3.249476E-02 | 4.636914E-03 | | | |
| 51 | 6.191174E-02 | -1.631123E-02 | 1.475229E-03 | | | |
| 52 | 3.509045E-02 | -7.813182E-03 | 7.506618E-04 | | | |
| 61 | -2.223138E-03 | 1.514165E-03 | -2.695273E-04 | | | |
| 62 | -6.463811E-03 | 1.194589E-03 | -8.619156E-05 | | | |
| 71 | -4.053949E-03 | 7.442682E-04 | -5.071216E-05 | | | |
| 72 | 7.863258E-04 | -4.395448E-05 | 8.969116E-07 | | | |
| 81 | 1.142760E-03 | -7.56716E-05 | 1.99566E-06 | | | |
| 82 | 8.847154E-06 | -6.19153E-07 | 1.48763E-08 | | | |

FIG. 33

| Sixth Example |||||||
|---|---|---|---|---|---|---|
| EFL=4.327mm; HFOV=39.143degrees; TTL=5.744mm; Fno=1.700; ImgH=4.500mm |||||||
| No. | Radius (mm) | Ape. Stop Distance Lens Thickness Air Gap (mm) | Material | Refractive Index | Abbe No. | Focal Length (mm) |
| Object | Infinity | Infinity | | | | |
| 99 Ape. Stop | Infinity | -0.401 | | | | |
| 11 First Lens | 2.096 | 0.597 | T1 Plastic | 1.545 | 55.987 | 5.844 |
| 12 | 5.485 | 0.194 | G12 | | | |
| 21 Second Lens | 134.932 | 0.200 | T2 Plastic | 1.661 | 20.373 | -13.108 |
| 22 | 8.207 | 0.093 | G23 | | | |
| 31 Third Lens | 5.079 | 0.437 | T3 Plastic | 1.545 | 55.987 | 6.196 |
| 32 | -9.835 | 0.191 | G34 | | | |
| 41 Fourth Lens | -10.617 | 0.200 | T4 Plastic | 1.661 | 20.373 | -15.112 |
| 42 | 201.405 | 0.179 | G45 | | | |
| 51 Fifth Lens | 8.220 | 0.280 | T5 Plastic | 1.661 | 20.373 | 15.278 |
| 52 | 41.895 | 0.276 | G56 | | | |
| 61 Sixth Lens | -66.138 | 0.495 | T6 Plastic | 1.545 | 55.987 | -14.829 |
| 62 | 9.255 | 0.474 | G67 | | | |
| 71 Seventh Lens | 3.573 | 0.751 | T7 Plastic | 1.545 | 55.987 | 358.420 |
| 72 | 3.370 | 0.338 | G78 | | | |
| 81 Eighth Lens | 2.521 | 0.532 | T8 Plastic | 1.545 | 55.987 | -19.931 |
| 82 | 1.894 | 0.380 | G8F | | | |
| 90 Filter | Infinity | 0.110 | | 1.517 | 64.167 | |
| | Infinity | 0.014 | | | | |
| 91 Image Plane | Infinity | 0.000 | | | | |

FIG. 34

| No. | K | $a_2$ | $a_4$ | $a_6$ | $a_8$ | $a_{10}$ |
|---|---|---|---|---|---|---|
| 11 | -6.209029E-01 | 0.000000E+00 | 8.122319E-03 | -9.229138E-04 | -2.771621E-03 | 4.398845E-03 |
| 12 | -3.971049E+01 | 0.000000E+00 | 3.425809E-02 | -4.398033E-02 | -3.370296E-03 | 7.360470E-02 |
| 21 | 7.664376E-03 | 0.000000E+00 | 5.535814E-02 | -2.196835E-01 | 3.653141E-01 | -3.420686E-01 |
| 22 | 2.422119E+01 | 0.000000E+00 | 1.339004E-01 | -4.361329E-01 | 7.529384E-01 | -7.653172E-01 |
| 31 | -8.008869E+00 | 0.000000E+00 | 1.148544E-01 | -3.011881E-01 | 4.310147E-01 | -3.815319E-01 |
| 32 | 3.377172E+01 | 0.000000E+00 | 7.932762E-02 | -1.844695E-01 | 2.103814E-01 | -1.814507E-01 |
| 41 | -2.813550E+01 | 0.000000E+00 | 1.843447E-01 | -3.846369E-01 | 5.231013E-01 | -4.865787E-01 |
| 42 | 0.000000E+00 | 0.000000E+00 | 1.652727E-01 | -3.949375E-01 | 5.590817E-01 | -5.000503E-01 |
| 51 | -6.696711E+01 | 0.000000E+00 | 8.643695E-02 | -2.444232E-01 | 2.326094E-01 | -1.461425E-01 |
| 52 | -1.751589E-01 | 0.000000E+00 | 9.338855E-02 | -1.678258E-01 | 8.391928E-02 | -1.281764E-03 |
| 61 | 0.000000E+00 | 0.000000E+00 | 4.883246E-02 | -6.643516E-02 | 2.608528E-02 | -1.179881E-02 |
| 62 | 2.122762E+01 | 0.000000E+00 | -1.787882E-02 | -2.907219E-03 | -4.261597E-03 | 2.223521E-03 |
| 71 | -3.579035E+01 | 0.000000E+00 | 5.073864E-02 | -5.985150E-02 | 2.714423E-02 | -8.471576E-03 |
| 72 | -3.551263E+01 | 0.000000E+00 | 6.470033E-02 | -4.532378E-02 | 1.498874E-02 | -2.925102E-03 |
| 81 | -2.923325E+01 | 0.000000E+00 | 2.137635E-02 | -6.275805E-02 | 3.196122E-02 | -7.774597E-03 |
| 82 | -7.002234E+00 | 0.000000E+00 | 4.480771E-03 | -1.661348E-02 | 5.140760E-03 | -7.337006E-04 |

| No. | $a_{12}$ | $a_{14}$ | $a_{16}$ | $a_{18}$ | $a_{20}$ | |
|---|---|---|---|---|---|---|
| 11 | -3.220599E-03 | 3.118148E-04 | 1.513446E-04 | | | |
| 12 | -1.007064E-01 | 5.548344E-02 | -1.083954E-02 | | | |
| 21 | 1.687531E-01 | -3.578188E-02 | 1.469278E-03 | | | |
| 22 | 4.484709E-01 | -1.391503E-01 | 1.753199E-02 | | | |
| 31 | 1.918249E-01 | -5.088379E-02 | 5.860840E-03 | | | |
| 32 | 1.018200E-01 | -3.218667E-02 | 4.559678E-03 | | | |
| 41 | 2.731233E-01 | -8.135837E-02 | 9.810217E-03 | | | |
| 42 | 2.629296E-01 | -7.571639E-02 | 9.226520E-03 | | | |
| 51 | 6.345598E-02 | -2.144784E-02 | 3.500331E-03 | | | |
| 52 | -1.926505E-02 | 8.082007E-03 | -1.058621E-03 | | | |
| 61 | 6.045797E-03 | -1.749898E-03 | 1.801574E-04 | | | |
| 62 | -4.949852E-04 | 6.920297E-05 | -4.595428E-06 | | | |
| 71 | 1.377214E-03 | -1.129564E-04 | 4.493772E-06 | | | |
| 72 | 3.178978E-04 | -1.749378E-05 | 3.670826E-07 | | | |
| 81 | 1.018264E-03 | -6.99876E-05 | 1.99037E-06 | | | |
| 82 | 5.618286E-05 | -2.24082E-06 | 3.64176E-08 | | | |

FIG. 35

| Seventh Example |||||||
|---|---|---|---|---|---|---|
| EFL=4.381mm; HFOV=40.147degrees; TTL=5.750mm; Fno=1.700; ImgH=4.500mm |||||||
| No. | Radius (mm) | Ape. Stop Distance Lens Thickness Air Gap (mm) | Material | Refractive Index | Abbe No. | Focal Length (mm) |
| Object | Infinity | Infinity | | | | |
| 99 Ape. Stop | Infinity | -0.408 | | | | |
| 11 First Lens | 2.073 | 0.470 | T1 Plastic | 1.545 | 55.987 | 6.532 |
| 12 | 4.553 | 0.152 | G12 | | | |
| 21 Second Lens | 25.442 | 0.200 | T2 Plastic | 1.661 | 20.373 | -17.887 |
| 22 | 8.097 | 0.067 | G23 | | | |
| 31 Third Lens | 5.134 | 0.786 | T3 Plastic | 1.545 | 55.987 | 6.161 |
| 32 | -9.243 | 0.078 | G34 | | | |
| 41 Fourth Lens | -9.277 | 0.200 | T4 Plastic | 1.661 | 20.373 | -13.767 |
| 42 | 926.726 | 0.129 | G45 | | | |
| 51 Fifth Lens | 6.846 | 0.200 | T5 Plastic | 1.661 | 20.373 | 20.816 |
| 52 | 13.346 | 0.533 | G56 | | | |
| 61 Sixth Lens | -18.019 | 0.200 | T6 Plastic | 1.545 | 55.987 | -13.360 |
| 62 | 12.315 | 0.206 | G67 | | | |
| 71 Seventh Lens | 2.488 | 0.712 | T7 Plastic | 1.545 | 55.987 | 14.391 |
| 72 | 3.271 | 0.600 | G78 | | | |
| 81 Eighth Lens | 6.510 | 0.761 | T8 Plastic | 1.545 | 55.987 | -8.004 |
| 82 | 2.508 | 0.324 | G8F | | | |
| 90 Filter | Infinity | 0.110 | | 1.517 | 64.167 | |
| | Infinity | 0.021 | | | | |
| 91 Image Plane | Infinity | 0.000 | | | | |

FIG. 36

| No. | K | $a_2$ | $a_4$ | $a_6$ | $a_8$ | $a_{10}$ |
|---|---|---|---|---|---|---|
| 11 | -6.920132E-01 | 0.000000E+00 | 7.644567E-03 | 6.561204E-03 | -2.207880E-02 | 2.580440E-02 |
| 12 | -3.447418E+01 | 0.000000E+00 | 6.435747E-02 | -9.389345E-02 | 2.925779E-02 | 5.257452E-02 |
| 21 | 2.106134E+00 | 0.000000E+00 | 9.914490E-02 | -3.022137E-01 | 4.024123E-01 | -3.060000E-01 |
| 22 | 2.331935E+01 | 0.000000E+00 | 1.875782E-01 | -5.787688E-01 | 9.260189E-01 | -8.931514E-01 |
| 31 | -1.214945E+01 | 0.000000E+00 | 1.264679E-01 | -3.863867E-01 | 6.218307E-01 | -6.269714E-01 |
| 32 | 3.009024E+01 | 0.000000E+00 | 1.028470E-01 | -2.839079E-01 | 4.175666E-01 | -4.395539E-01 |
| 41 | -2.562176E+01 | 0.000000E+00 | 2.144770E-01 | -5.346615E-01 | 8.745226E-01 | -9.378763E-01 |
| 42 | 0.000000E+00 | 0.000000E+00 | 1.766217E-01 | -4.941560E-01 | 8.021535E-01 | -7.900611E-01 |
| 51 | -4.475958E+01 | 0.000000E+00 | 1.159670E-01 | -3.240579E-01 | 3.524248E-01 | -2.596781E-01 |
| 52 | -1.218893E+01 | 0.000000E+00 | 7.640316E-02 | -1.546454E-01 | 9.088465E-02 | -1.956155E-02 |
| 61 | 0.000000E+00 | 0.000000E+00 | 4.794295E-02 | -4.927818E-02 | 1.515599E-02 | -5.536342E-05 |
| 62 | 2.673816E+01 | 0.000000E+00 | -3.119608E-02 | 7.795365E-03 | -1.722048E-02 | 1.226744E-02 |
| 71 | -1.379279E+01 | 0.000000E+00 | 1.159283E-02 | -2.717111E-02 | 2.172965E-03 | 3.533706E-03 |
| 72 | -1.982358E+01 | 0.000000E+00 | 3.492141E-02 | -2.487408E-02 | 6.919247E-03 | -1.072505E-03 |
| 81 | -6.229059E+00 | 0.000000E+00 | -8.387380E-02 | 1.606704E-02 | 1.764954E-03 | -1.064259E-03 |
| 82 | -4.890078E+00 | 0.000000E+00 | -3.272372E-02 | 5.740090E-03 | -6.258218E-04 | 5.130264E-05 |
| No. | $a_{12}$ | $a_{14}$ | $a_{16}$ | $a_{18}$ | $a_{20}$ | |
| 11 | -1.533442E-02 | 3.242500E-03 | -9.986122E-06 | | | |
| 12 | -7.680637E-02 | 3.953889E-02 | -7.147032E-03 | | | |
| 21 | 1.283629E-01 | -2.454340E-02 | 1.026192E-03 | | | |
| 22 | 5.167327E-01 | -1.657940E-01 | 2.259917E-02 | | | |
| 31 | 3.737540E-01 | -1.203420E-01 | 1.634382E-02 | | | |
| 32 | 2.838516E-01 | -9.620171E-02 | 1.307460E-02 | | | |
| 41 | 5.931961E-01 | -1.984299E-01 | 2.701501E-02 | | | |
| 42 | 4.510888E-01 | -1.390176E-01 | 1.780001E-02 | | | |
| 51 | 1.252329E-01 | -3.847177E-02 | 5.291205E-03 | | | |
| 52 | -7.153396E-03 | 4.564007E-03 | -6.711731E-04 | | | |
| 61 | -4.077341E-03 | 2.011299E-03 | -3.137154E-04 | | | |
| 62 | -5.769979E-03 | 1.469343E-03 | -1.362337E-04 | | | |
| 71 | -2.403941E-03 | 5.512597E-04 | -4.199795E-05 | | | |
| 72 | 9.328907E-05 | -4.312400E-06 | 8.275620E-08 | | | |
| 81 | 1.561179E-04 | -1.04084E-05 | 2.75812E-07 | | | |
| 82 | -3.214366E-06 | 1.24244E-07 | -2.14008E-09 | | | |

FIG. 37

| Eighth Example ||||||||
|---|---|---|---|---|---|---|---|
| | EFL=4.360mm; HFOV=39.885degrees; TTL=5.694mm; Fno=1.700; ImgH=4.500mm ||||||||
| No. | | Radius (mm) | Ape. Stop Distance Lens Thickness Air Gap (mm) | | Material | Refractive Index | Abbe No. | Focal Length (mm) |
| | Object | Infinity | Infinity | | | | | |
| 99 | Ape. Stop | Infinity | -0.408 | | | | | |
| 11 | First Lens | 2.081 | 0.470 | T1 | Plastic | 1.545 | 55.987 | 5.927 |
| 12 | | 5.358 | 0.212 | G12 | | | | |
| 21 | Second Lens | 141.990 | 0.200 | T2 | Plastic | 1.661 | 20.373 | -12.336 |
| 22 | | 7.775 | 0.044 | G23 | | | | |
| 31 | Third Lens | 5.164 | 0.740 | T3 | Plastic | 1.545 | 55.987 | 6.754 |
| 32 | | -12.273 | 0.087 | G34 | | | | |
| 41 | Fourth Lens | -8.329 | 0.207 | T4 | Plastic | 1.661 | 20.373 | 84.578 |
| 42 | | -7.330 | 0.493 | G45 | | | | |
| 51 | Fifth Lens | -90.405 | 0.238 | T5 | Plastic | 1.661 | 20.373 | -64.187 |
| 52 | | 81.440 | 0.305 | G56 | | | | |
| 61 | Sixth Lens | -31.050 | 0.429 | T6 | Plastic | 1.545 | 55.987 | -16.569 |
| 62 | | 12.838 | 0.177 | G67 | | | | |
| 71 | Seventh Lens | 2.199 | 0.524 | T7 | Plastic | 1.545 | 55.987 | 27.920 |
| 72 | | 2.353 | 0.769 | G78 | | | | |
| 81 | Eighth Lens | 2.233 | 0.370 | T8 | Plastic | 1.545 | 55.987 | -13.183 |
| 82 | | 1.605 | 0.300 | G8F | | | | |
| 90 | Filter | Infinity | 0.110 | | | 1.517 | 64.167 | |
| | | Infinity | 0.020 | | | | | |
| 91 | Image Plane | Infinity | 0.000 | | | | | |

FIG. 38

| No. | K | $a_2$ | $a_4$ | $a_6$ | $a_8$ | $a_{10}$ |
|---|---|---|---|---|---|---|
| 11 | -6.603686E-01 | 0.000000E+00 | 7.240250E-03 | 2.230749E-03 | -9.233638E-03 | 1.126401E-02 |
| 12 | -3.982163E+01 | 0.000000E+00 | 3.433884E-02 | -4.714862E-02 | 1.735010E-02 | 1.358201E-02 |
| 21 | 3.263867E-03 | 0.000000E+00 | 6.709923E-02 | -2.236568E-01 | 3.424344E-01 | -3.301332E-01 |
| 22 | 2.515180E+01 | 0.000000E+00 | 1.905129E-01 | -5.919912E-01 | 9.919080E-01 | -1.023904E+00 |
| 31 | -7.793078E+00 | 0.000000E+00 | 1.466243E-01 | -4.615120E-01 | 7.613898E-01 | -7.779687E-01 |
| 32 | 3.422483E+01 | 0.000000E+00 | 9.990951E-02 | -2.422341E-01 | 2.193177E-01 | -1.181586E-01 |
| 41 | -1.085453E+01 | 0.000000E+00 | 2.007113E-01 | -3.513814E-01 | 3.035137E-01 | -1.716143E-01 |
| 42 | 0.000000E+00 | 0.000000E+00 | 1.255934E-01 | -1.951158E-01 | 1.636178E-01 | -1.048978E-01 |
| 51 | 2.165401E-02 | 0.000000E+00 | 6.409855E-02 | -1.743170E-01 | 1.495922E-01 | -1.099389E-01 |
| 52 | -2.288873E-02 | 0.000000E+00 | 9.259013E-02 | -1.939375E-01 | 1.725398E-01 | -1.165346E-01 |
| 61 | 0.000000E+00 | 0.000000E+00 | 8.828754E-02 | -1.674052E-01 | 1.489774E-01 | -8.795241E-02 |
| 62 | -1.020796E+00 | 0.000000E+00 | 3.359271E-02 | -1.031950E-01 | 8.048701E-02 | -3.852216E-02 |
| 71 | -1.525517E+01 | 0.000000E+00 | 6.571643E-02 | -8.919832E-02 | 4.629296E-02 | -1.728049E-02 |
| 72 | -1.982876E+01 | 0.000000E+00 | 4.924952E-02 | -4.514409E-02 | 1.472406E-02 | -2.587523E-03 |
| 81 | -1.699492E+01 | 0.000000E+00 | -8.001772E-02 | -1.891855E-02 | 1.796651E-02 | -4.500804E-03 |
| 82 | -6.296979E+00 | 0.000000E+00 | -4.437290E-02 | 5.007604E-03 | 6.331708E-04 | -2.097008E-04 |
| No. | a12 | a14 | a16 | a18 | a20 | |
| 11 | -7.722690E-03 | 2.108303E-03 | -1.839182E-04 | | | |
| 12 | -2.632658E-02 | 1.503121E-02 | -2.922546E-03 | | | |
| 21 | 1.924894E-01 | -6.033123E-02 | 7.716599E-03 | | | |
| 22 | 6.295793E-01 | -2.100635E-01 | 2.920244E-02 | | | |
| 31 | 4.675796E-01 | -1.507667E-01 | 2.037446E-02 | | | |
| 32 | 4.357335E-02 | -1.178635E-02 | 1.884566E-03 | | | |
| 41 | 7.981101E-02 | -2.973744E-02 | 5.364738E-03 | | | |
| 42 | 5.776646E-02 | -2.311781E-02 | 4.074739E-03 | | | |
| 51 | 5.201277E-02 | -1.263988E-02 | 7.958998E-04 | | | |
| 52 | 5.198142E-02 | -1.275959E-02 | 1.269555E-03 | | | |
| 61 | 3.040277E-02 | -5.405277E-03 | 3.613583E-04 | | | |
| 62 | 1.104405E-02 | -1.758318E-03 | 1.207308E-04 | | | |
| 71 | 4.340024E-03 | -6.532003E-04 | 4.217315E-05 | | | |
| 72 | 2.500760E-04 | -1.269378E-05 | 2.671822E-07 | | | |
| 81 | 5.380357E-04 | -3.17433E-05 | 7.49265E-07 | | | |
| 82 | 2.053970E-05 | -9.11528E-07 | 1.56604E-08 | | | |

FIG. 39

| Ninth Example | | | | | | | |
|---|---|---|---|---|---|---|---|
| EFL=4.080mm; HFOV=41.957degrees; TTL=5.430mm; Fno=1.700; ImgH=4.500mm | | | | | | | |
| No. | Radius (mm) | Ape. Stop Distance Lens Thickness Air Gap (mm) | | Material | Refractive Index | Abbe No. | Focal Length (mm) |
| Object | Infinity | Infinity | | | | | |
| 99 | Ape. Stop | Infinity | -0.355 | | | | |
| 11 | First Lens | 2.071 | 0.466 | T1 | Plastic | 1.545 | 55.987 | 6.610 |
| 12 | | 4.470 | 0.214 | G12 | | | | |
| 21 | Second Lens | 22.019 | 0.200 | T2 | Plastic | 1.661 | 20.373 | -18.155 |
| 22 | | 7.785 | 0.036 | G23 | | | | |
| 31 | Third Lens | 4.811 | 0.552 | T3 | Plastic | 1.545 | 55.987 | 6.097 |
| 32 | | -10.386 | 0.043 | G34 | | | | |
| 41 | Fourth Lens | -9.144 | 0.276 | T4 | Plastic | 1.661 | 20.373 | -21.547 |
| 42 | | -25.433 | 0.409 | G45 | | | | |
| 51 | Fifth Lens | 19.594 | 0.234 | T5 | Plastic | 1.661 | 20.373 | -1015.193 |
| 52 | | 18.953 | 0.246 | G56 | | | | |
| 61 | Sixth Lens | 8.966 | 0.372 | T6 | Plastic | 1.545 | 55.987 | 144.576 |
| 62 | | 9.966 | 0.337 | G67 | | | | |
| 71 | Seventh Lens | 2.290 | 0.457 | T7 | Plastic | 1.545 | 55.987 | 21.422 |
| 72 | | 2.647 | 0.656 | G78 | | | | |
| 81 | Eighth Lens | 2.206 | 0.416 | T8 | Plastic | 1.545 | 55.987 | -6.149 |
| 82 | | 1.243 | 0.334 | G8F | | | | |
| 90 | Filter | Infinity | 0.110 | | | 1.517 | 64.167 | |
| | | Infinity | 0.071 | | | | | |
| 91 | Image Plane | Infinity | 0.000 | | | | | |

FIG. 40

| No. | K | $a_2$ | $a_4$ | $a_6$ | $a_8$ | $a_{10}$ |
|---|---|---|---|---|---|---|
| 11 | -7.507371E-01 | 0.000000E+00 | 8.082916E-03 | 1.295374E-03 | -5.685085E-03 | 1.416438E-03 |
| 12 | -3.314609E+01 | 0.000000E+00 | 5.111104E-02 | -6.271141E-02 | 2.926762E-02 | -1.032033E-02 |
| 21 | -1.290352E+01 | 0.000000E+00 | 6.471448E-02 | -1.687437E-01 | 1.885006E-01 | -1.529289E-01 |
| 22 | 2.451165E+01 | 0.000000E+00 | 1.808110E-01 | -5.022673E-01 | 7.977743E-01 | -8.165647E-01 |
| 31 | -8.668734E+00 | 0.000000E+00 | 1.319503E-01 | -3.974219E-01 | 6.555995E-01 | -6.563932E-01 |
| 32 | 3.126730E+01 | 0.000000E+00 | 1.708460E-01 | -4.757771E-01 | 6.361080E-01 | -5.408103E-01 |
| 41 | -2.416523E+01 | 0.000000E+00 | 2.429385E-01 | -5.467772E-01 | 7.273405E-01 | -6.506238E-01 |
| 42 | 0.000000E+00 | 0.000000E+00 | 1.084177E-01 | -2.025007E-01 | 2.571834E-01 | -2.391821E-01 |
| 51 | -1.079696E+01 | 0.000000E+00 | 8.673789E-02 | -2.557521E-01 | 2.714725E-01 | -1.873007E-01 |
| 52 | -1.336487E+00 | 0.000000E+00 | 1.292910E-01 | -3.056889E-01 | 3.089588E-01 | -2.039724E-01 |
| 61 | 0.000000E+00 | 0.000000E+00 | 8.004736E-02 | -1.122389E-01 | 5.907883E-02 | -1.449098E-02 |
| 62 | -9.752130E+00 | 0.000000E+00 | -6.190491E-03 | -8.561170E-03 | -1.109574E-02 | 1.113772E-02 |
| 71 | -1.578255E+01 | 0.000000E+00 | 8.473176E-02 | -9.641522E-02 | 4.357299E-02 | -1.545470E-02 |
| 72 | -2.626374E+01 | 0.000000E+00 | 1.075510E-01 | -8.464434E-02 | 2.930876E-02 | -5.771848E-03 |
| 81 | -4.974951E+01 | 0.000000E+00 | -4.754679E-02 | -2.873254E-02 | 2.405473E-02 | -6.558377E-03 |
| 82 | -9.584792E+00 | 0.000000E+00 | -1.514558E-02 | -4.106842E-03 | 2.123227E-03 | -3.435197E-04 |
| No. | $a_{12}$ | $a_{14}$ | $a_{16}$ | $a_{18}$ | $a_{20}$ | |
| 11 | 1.634295E-03 | -2.075327E-03 | 5.521660E-04 | | | |
| 12 | -2.023330E-03 | 4.477383E-03 | -1.186622E-03 | | | |
| 21 | 8.712793E-02 | -2.780641E-02 | 3.581993E-03 | | | |
| 22 | 5.075683E-01 | -1.723748E-01 | 2.433256E-02 | | | |
| 31 | 3.697254E-01 | -1.070203E-01 | 1.245801E-02 | | | |
| 32 | 2.770397E-01 | -7.631047E-02 | 8.796442E-03 | | | |
| 41 | 3.669509E-01 | -1.164749E-01 | 1.582656E-02 | | | |
| 42 | 1.407150E-01 | -4.740303E-02 | 6.835040E-03 | | | |
| 51 | 6.763934E-02 | -9.110739E-03 | -7.910856E-04 | | | |
| 52 | 8.097950E-02 | -1.736437E-02 | 1.544033E-03 | | | |
| 61 | -3.172209E-03 | 2.522376E-03 | -3.798622E-04 | | | |
| 62 | -5.320965E-03 | 1.228958E-03 | -1.046763E-04 | | | |
| 71 | 3.486926E-03 | -4.215593E-04 | 2.096027E-05 | | | |
| 72 | 6.523731E-04 | -3.958074E-05 | 9.951079E-07 | | | |
| 81 | 8.535618E-04 | -5.40299E-05 | 1.33945E-06 | | | |
| 82 | 2.626848E-05 | -9.69919E-07 | 1.39344E-08 | | | |

FIG. 41

| Example | 1 | 2 | 3 | 4 | 5 | 6 | 7 | 8 | 9 |
|---|---|---|---|---|---|---|---|---|---|
| BFL | 0.530 | 0.343 | 0.418 | 0.445 | 1.075 | 0.504 | 0.456 | 0.430 | 0.516 |
| ALT | 2.733 | 2.596 | 2.730 | 2.607 | 3.112 | 3.493 | 3.529 | 3.178 | 2.974 |
| AAG | 2.407 | 2.087 | 1.999 | 1.981 | 1.556 | 1.747 | 1.765 | 2.087 | 1.941 |
| TL | 5.140 | 4.683 | 4.729 | 4.588 | 4.668 | 5.240 | 5.294 | 5.264 | 4.915 |
| TTL | 5.670 | 5.026 | 5.147 | 5.033 | 5.743 | 5.744 | 5.750 | 5.694 | 5.430 |
| D61t82/D21t42 | 2.181 | 2.999 | 1.889 | 2.028 | 1.750 | 2.310 | 1.861 | 1.776 | 2.022 |
| υ1+υ2+υ3+υ4+υ5 | 173.093 | 173.093 | 202.368 | 182.905 | 173.093 | 173.093 | 173.093 | 173.093 | 173.093 |
| υ4+υ5 | 40.746 | 40.746 | 70.021 | 50.559 | 40.746 | 40.746 | 40.746 | 40.746 | 40.746 |
| υ4 | 20.373 | 20.373 | 20.401 | 30.186 | 20.373 | 20.373 | 20.373 | 20.373 | 20.373 |
| υ7 | 55.987 | 55.987 | 55.987 | 55.987 | 55.987 | 55.987 | 55.987 | 55.987 | 55.987 |
| TTL/ImgH | 1.260 | 1.117 | 1.144 | 1.118 | 1.276 | 1.276 | 1.278 | 1.265 | 1.207 |
| EFL*Fno/ImgH | 1.800 | 1.185 | 1.239 | 1.228 | 1.720 | 1.635 | 1.655 | 1.647 | 1.541 |
| TL*Fno/ImgH | 1.931 | 1.613 | 1.629 | 1.580 | 1.764 | 1.980 | 2.000 | 1.989 | 1.857 |
| ALT/AAG | 1.135 | 1.244 | 1.365 | 1.316 | 2.000 | 2.000 | 2.000 | 1.523 | 1.532 |
| (ALT+BFL)/AAG48 | 1.566 | 1.597 | 1.794 | 1.775 | 4.101 | 3.152 | 2.716 | 2.069 | 2.117 |
| ALT/(T3+T6+G12) | 2.401 | 3.023 | 2.567 | 2.763 | 2.300 | 3.100 | 3.100 | 2.302 | 2.614 |
| (T1+T2+T5+G23)/(T3+G45) | 0.899 | 1.060 | 0.924 | 1.020 | 1.150 | 1.898 | 1.023 | 0.773 | 0.974 |
| (T1+T2+T5+G34)/(T3+G56) | 1.110 | 1.176 | 0.814 | 1.018 | 1.370 | 1.778 | 0.719 | 0.953 | 1.180 |
| (T1+T2+T5+G67)/(T3+G78) | 0.596 | 0.928 | 0.688 | 0.921 | 1.572 | 2.000 | 0.776 | 0.720 | 1.024 |
| (T7+T8+G23)/(T4+G12+G45) | 0.787 | 1.413 | 1.308 | 1.166 | 1.062 | 2.399 | 3.200 | 1.029 | 1.012 |
| (T7+T8+G34)/(T4+G12+G56) | 0.999 | 1.584 | 1.093 | 1.164 | 1.244 | 2.199 | 1.753 | 1.354 | 1.244 |
| (T7+T8+G67)/(T4+G12+G78) | 0.514 | 1.130 | 0.832 | 1.002 | 1.415 | 2.399 | 1.764 | 0.901 | 1.056 |
| D42t71/(T3+G12) | 1.546 | 2.364 | 1.489 | 1.835 | 1.642 | 2.700 | 1.351 | 1.724 | 2.087 |
| D42t71/(T3+G78) | 0.741 | 1.159 | 0.834 | 1.075 | 2.052 | 2.198 | 0.915 | 1.088 | 1.323 |

FIG. 42

OPTICAL IMAGING LENS INCLUDING EIGHT LENSES OF +−+−+−+−, +−+−+−+++, +−++−−+−, OR +−+−−++− REFRACTIVE POWERS

CROSS REFERENCE TO RELATED APPLICATIONS

This application is a continuation application of U.S. application Ser. No. 16/820,734, filed on Mar. 17, 2020. The content of the application is incorporated herein by reference.

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos.

2. Description of the Prior Art

The specifications of portable electronic devices are changing with each passing day, and the optical imaging lenses in its key components are also developing more diversified. For the main lens of portable electronic devices, it not only requires a larger aperture and maintains a shorter system length, but also pursues higher pixels and higher resolution. However, the optical imaging lens with high pixels needs to increase the image height of the lens, and larger image sensors are used to receive imaging ray to improve pixel requirements. However, the design of large aperture allows the lens to receive more imaging ray, but at the same time, it makes the design more difficult, while the high pixel increases the resolution of the lens, which also increases the design difficulty in combination with the large aperture design.

Therefore, how to add multiple lens elements in a length-limited system to increase the resolution and simultaneously increase the aperture and the image height is a problem that needs to be challenged and solved.

SUMMARY OF THE INVENTION

In light of the above, the present invention proposes an optical imaging lens of eight lens elements which is shorter in system length, has ensured imaging quality, and has smaller f-number, larger image height and technically possible. The optical imaging lens of eight lens elements of the present invention from an object side to an image side in order along an optical axis has a first lens element, a second lens element, a third lens element, a fourth lens element, a fifth lens element, a sixth lens element, a seventh lens element and an eighth lens element. Each first lens element, second lens element, third lens element, fourth lens element, fifth lens element, sixth lens element, seventh lens element and eighth lens element respectively has an object-side surface which faces toward the object side to allow imaging rays to pass through as well as an image-side surface which faces toward the image side to allow the imaging rays to pass through.

In one embodiment of the present invention, the first lens element has positive refracting power, and an optical axis region of the image-side surface of the first lens element is concave, the second lens has negative refracting power, a periphery region of the object-side surface of the second lens element is concave, and an optical axis region of the object-side surface of the eighth lens element is convex. The lens elements having refracting power included by the optical imaging lens are only the eight lens elements described above, wherein the optical imaging lens satisfies the relationships: $D61t82/D21t42 \geq 1.750$ wherein $D61t82$ is a distance from the object-side surface of the sixth lens element to the image-side surface of the eighth lens element along the optical axis, $D21t42$ is a distance from the object-side surface of the second lens element to the image-side surface of the fourth lens element along the optical axis.

In another embodiment of the present invention, the first lens element has positive refracting power, and a periphery region of the image-side surface of the first lens element is concave, a periphery region of the image-side surface of the fourth lens element is convex, a periphery region of the object-side surface of the sixth lens element is concave, the seventh lens element has positive refracting power, an optical axis region of the object-side surface of the eighth lens element is convex. The lens elements having refracting power included by the optical imaging lens are only the eight lens elements described above, wherein the optical imaging lens satisfies the relationships: $D61t82/D21t42 \geq 2.000$, wherein $D61t82$ is a distance from the object-side surface of the sixth lens element to the image-side surface of the eighth lens element along the optical axis, $D21t42$ is a distance from the object-side surface of the second lens element to the image-side surface of the fourth lens element along the optical axis.

In another embodiment of the present invention, the first lens element has positive refracting power, and an optical axis region of the image-side surface of the first lens element is concave, a periphery region of the object-side surface of the second lens element is concave, a periphery region of the image-side surface of the third lens element is convex, and an optical axis region of the object-side surface of the eighth lens element is convex. The lens elements having refracting power included by the optical imaging lens are only the eight lens elements described above, wherein the optical imaging lens satisfies the relationships: $v1+v2+v3+v4+v5 \leq 205.000$, where $v1$ is an Abbe number of the first lens element, $v2$ is an Abbe number of the second lens element, $v3$ is an Abbe number of the third lens element, $v4$ is an Abbe number of the fourth lens element; $v5$ is an Abbe number of the fifth lens element.

In the optical imaging lens of the present invention, the embodiments may also selectively satisfy the following optical conditions:

$v4+v5 \leq 70.100;$  1.

$v4 \leq 35.000;$  2.

$EFL*Fno/ImgH \leq 1.800;$  3.

$ALT/AAG \leq 2.000;$  4.

$(T1+T2+T5+G23)/(T3+G45) \leq 1.900;$  5.

$(T7+T8+G23)/(T4+G12+G45) \leq 3.200;$  6.

$D42t71/(T3+G12) \leq 2.700;$  7.

$TTL/ImgH \leq 1.300;$  8.

$(ALT+BFL)/AAG48 \leq 4.150;$  9.

$(T1+T2+T5+G34)/(T3+G56) \leq 2.000;$  10.

$(T7+T8+G34)/(T4+G12+G56) \leq 2.200;$  11.

$D42t71/(T3+G78) \leq 2.200;$  12.

$49.000 \leq v7 \leq 60.000;$  13.

$TL*Fno/ImgH \leq 2.000;$  14.

$ALT/(T3+T6+G12) \leq 3.100;$  15.

$(T1+T2+T5+G67)/(T3+G78) \leq 2.000;$ and  16.

$(T7+T8+G67)/(T4+G12+G78) \leq 2.400.$  17.

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, T5 is a thickness of the fifth lens element along the optical axis, T6 is a thickness of the sixth lens element along the optical axis, T7 is a thickness of the seventh lens element along the optical axis, T8 is a thickness of the eighth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, G45 is an air gap between the fourth lens element and the fifth lens element along the optical axis, G56 is an air gap between the fifth lens element and the sixth lens element along the optical axis, G67 is an air gap between the sixth lens element and the seventh lens element along the optical axis, G78 is an air gap between the seventh lens element and the eighth lens element along the optical axis, ALT is a sum of the thicknesses of eight lens elements from the first lens element to the eighth lens element along the optical axis, TL is a distance from the object-side surface of the first lens element to the image-side surface of the eighth lens element along the optical axis, TTL is the distance from the object-side surface of the first lens element to an imaging plane along the optical axis, BFL is a distance from the image-side surface of the eighth lens element to an image plane along the optical axis, AAG is a sum of seven air gaps from the first lens element to the eighth lens element along the optical axis, EFL is an effective focal length of the optical imaging lens; ImgH is an image height of the optical imaging lens, and Fno is a f-number of the optical imaging lens.

Besides, the Abbe number of the first lens element is $v1$; the Abbe number of the second lens element is $v2$; the Abbe number of the third lens element is $v3$; the Abbe number of the fourth lens element is $v4$; the Abbe number of the fifth lens element is $v5$; an Abbe number of the sixth lens element is $v6$; an Abbe number of the seventh lens element is $v7$, an Abbe number of the eighth lens element is $v8$.

In the present invention, further defining: D21t42 is the distance from the object-side surface of the second lens element to the image-side surface of the fourth lens element along the optical axis; D42t71 is a distance from the image-side surface of the fourth lens element to the object-side surface of the seventh lens element along the optical axis; D61t82 is the distance from the object-side surface of the sixth lens element to the image-side surface of the eighth lens element along the optical axis; AAG48 is a sum of four air gaps from the fourth lens element to the eighth lens element along the optical axis, that is, the sum of G45, G56, G67 and G78.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 illustrates a third embodiment of the optical imaging lens of the present invention.

FIG. 11A illustrates the longitudinal spherical aberration on the image plane of the third embodiment.

FIG. 11B illustrates the field curvature aberration on the sagittal direction of the third embodiment.

FIG. 11C illustrates the field curvature aberration on the tangential direction of the third embodiment.

FIG. 11D illustrates the distortion of the third embodiment.

FIG. 12 illustrates a fourth embodiment of the optical imaging lens of the present invention.

FIG. 13A illustrates the longitudinal spherical aberration on the image plane of the fourth embodiment.

FIG. 13B illustrates the field curvature aberration on the sagittal direction of the fourth embodiment.

FIG. 13C illustrates the field curvature aberration on the tangential direction of the fourth embodiment.

FIG. 13D illustrates the distortion of the fourth embodiment.

FIG. 20 illustrates an eighth embodiment of the optical imaging lens of the present invention.

FIG. 21A illustrates the longitudinal spherical aberration on the image plane of the eighth embodiment.

FIG. 21B illustrates the field curvature aberration on the sagittal direction of the eighth embodiment.

FIG. 21C illustrates the field curvature aberration on the tangential direction of the eighth embodiment.

FIG. 21D illustrates the distortion of the eighth embodiment.

FIG. 24 shows the optical data of the first embodiment of the optical imaging lens.

FIG. 25 shows the aspheric surface data of the first embodiment.

FIG. 26 shows the optical data of the second embodiment of the optical imaging lens.

FIG. 27 shows the aspheric surface data of the second embodiment.

FIG. 28 shows the optical data of the third embodiment of the optical imaging lens.

FIG. 29 shows the aspheric surface data of the third embodiment.

FIG. 30 shows the optical data of the fourth embodiment of the optical imaging lens.

FIG. 31 shows the aspheric surface data of the fourth embodiment.

FIG. 32 shows the optical data of the fifth embodiment of the optical imaging lens.

FIG. 33 shows the aspheric surface data of the fifth embodiment.

FIG. 34 shows the optical data of the sixth embodiment of the optical imaging lens.

FIG. 35 shows the aspheric surface data of the sixth embodiment.

FIG. 36 shows the optical data of the seventh embodiment of the optical imaging lens.

FIG. 37 shows the aspheric surface data of the seventh embodiment.

FIG. 38 shows the optical data of the eighth embodiment of the optical imaging lens.

FIG. 39 shows the aspheric surface data of the eighth embodiment.

FIG. 40 shows the optical data of the ninth embodiment of the optical imaging lens.

FIG. 41 shows the aspheric surface data of the ninth embodiment.

FIG. 42 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
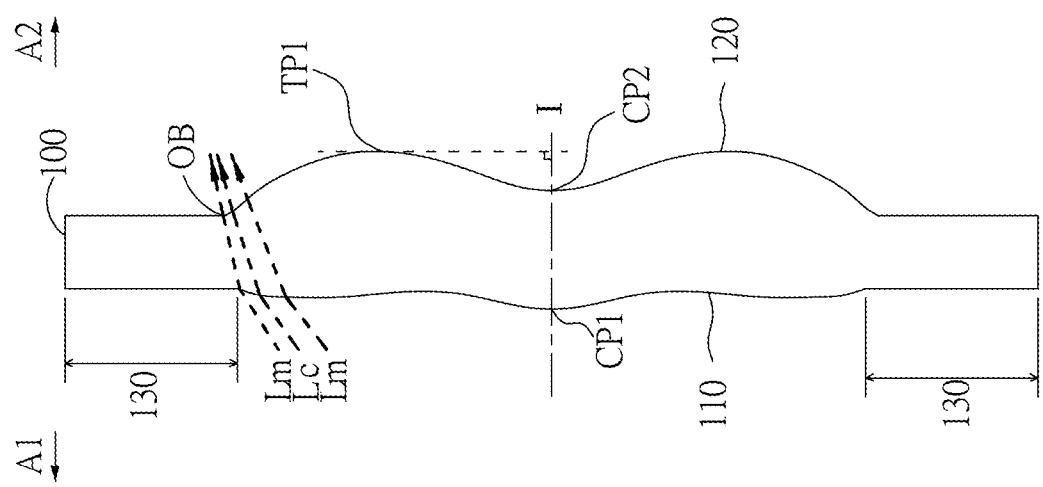

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
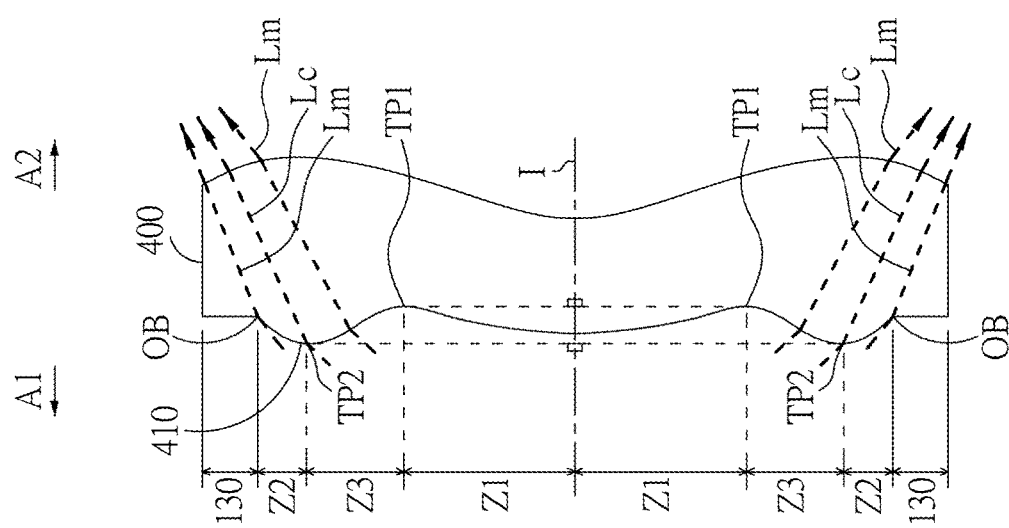

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only embodiments to explain the technologies, and should not be taken as limiting the scope of the present disclosure. The mounting portion 130 of the lens elements discussed below may be partially or completely omitted in the following drawings.

Figure 2:
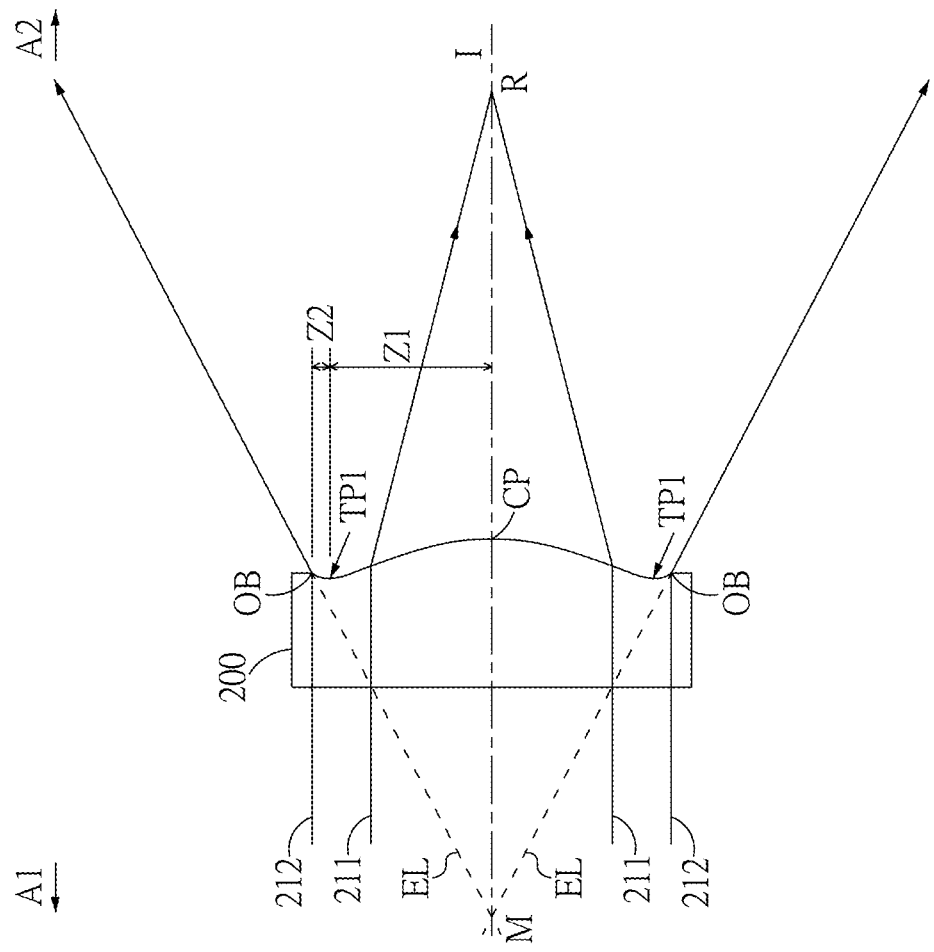
FIGS. 1-5 illustrates the methods for determining the surface shapes and for determining optical region or periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
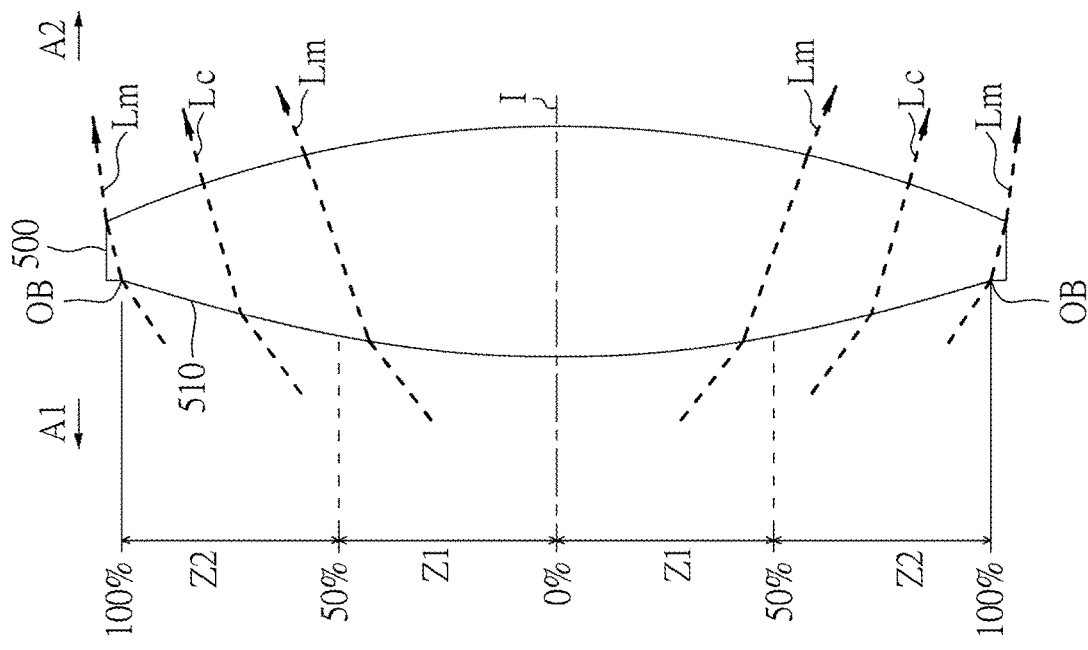
Figure 3:
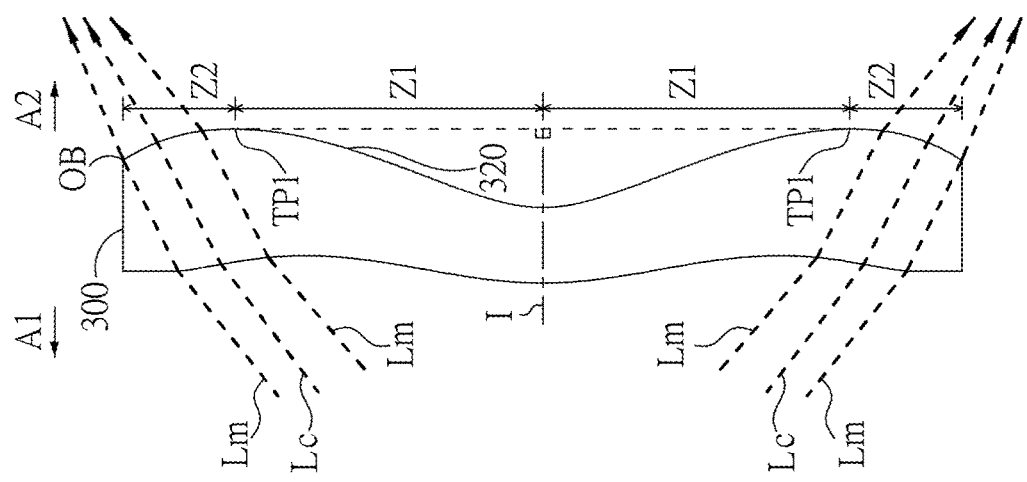

FIG. 3, FIG. 4 and FIG. 5 illustrate embodiments of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, For example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0).

Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
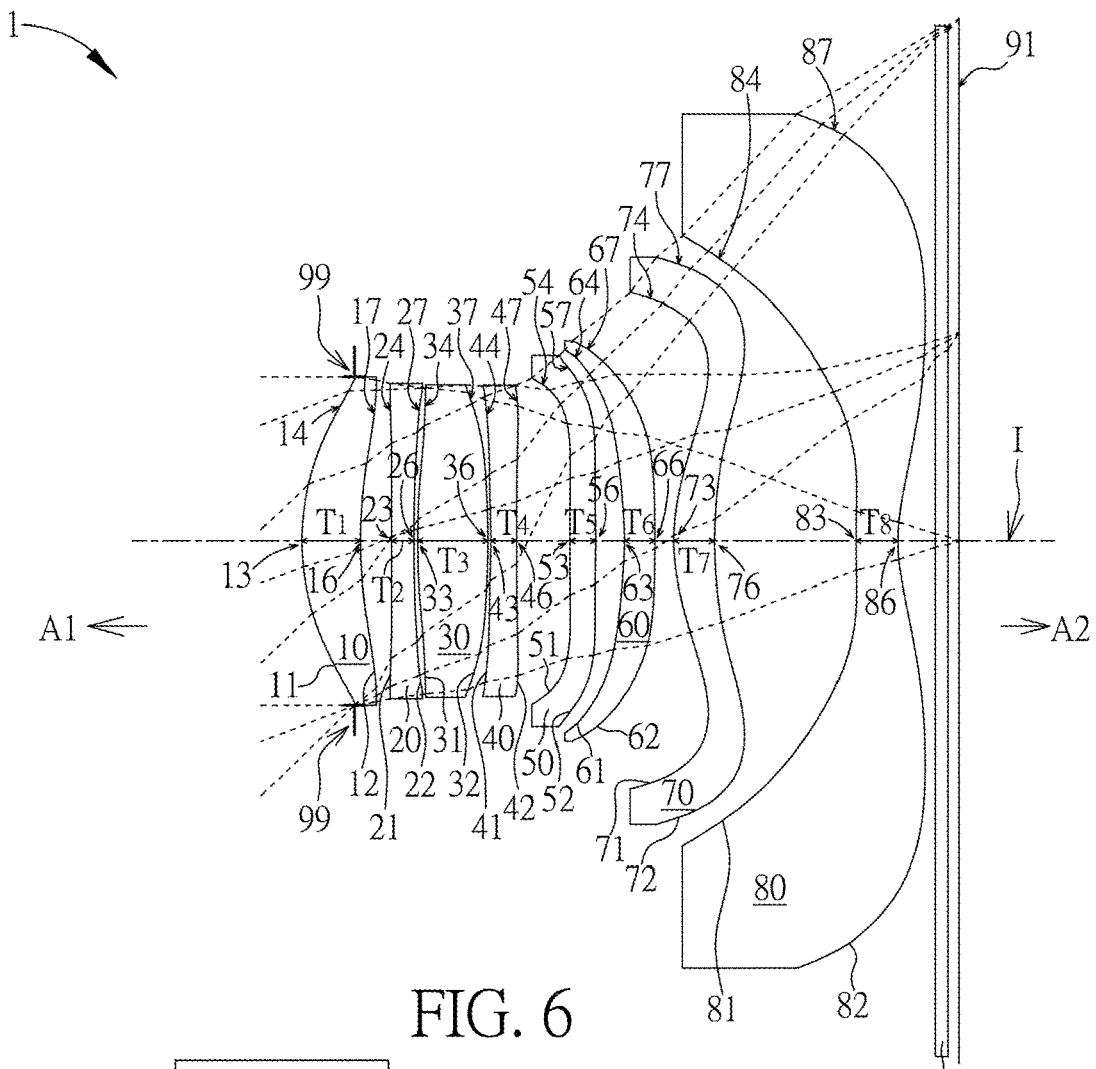
FIG. 6 illustrates a first embodiment of the optical imaging lens of the present invention.

As shown in FIG. 6, the optical imaging lens 1 of eight lens elements of the present invention, sequentially located from an object side A1 (where an object is located) to an image side A2 along an optical axis I, has an aperture stop (ape. stop) 99, a first lens element 10, a second lens element 20, a third lens element 30, a fourth lens element 40, a fifth lens element 50, a sixth lens element 60, a seventh lens element 70, an eighth lens element 80, a filter 90 and an image plane 91. Generally speaking, the first lens element 10, the second lens element 20, the third lens element 30, the fourth lens element 40, the fifth lens element 50, the sixth lens element 60, the seventh lens element 70 and the eighth lens element 80 may be made of a transparent plastic material but the present invention is not limited to this, and each has an appropriate refracting power. In the present invention, lens elements having refracting power included by the optical imaging lens 1 are only the eight lens elements described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 99 disposed in an appropriate position. In FIG. 6, the aperture stop 99 is disposed between the first lens element 10 and object side A1. When light emitted or reflected by an object (not shown) which is located at the object side A1 enters the optical imaging lens 1 of the present invention, it forms a clear and sharp image on the image plane 91 at the image side A2 after passing through the aperture stop 80, the first lens element 10, the second lens element 20, the third lens element 30, the fourth lens element 40, the fifth lens element 50, the sixth lens element 60, the seventh lens element 70, the eighth lens element 80 and the filter 90. In one embodiment of the present invention, the optional filter 90 may be a filter of various suitable functions, For example, the filter 90 may be an infrared cut filter (IR cut filter), placed between the eighth lens element 80 and the image plane 91.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62; the seventh lens element 70 has an object-side surface 71 and an image-side surface 72; and the eighth lens element 80 has an object-side surface 81 and an image-side surface 82. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7, the eighth lens element 80 has an eighth lens element thickness T8. Therefore, the sum of the thicknesses of eight lens elements from the first lens element 10 to the eighth lens element 80 in the optical imaging lens 1 along the optical axis I is ALT=T1+T2+T3+T4+T5+T6+T7+T8.

In addition, between two adjacent lens elements in the optical imaging lens 1 of the present invention there may be an air gap along the optical axis I. For example, there is an air gap G12 disposed between the first lens element 10 and the second lens element 20, an air gap G23 disposed between the second lens element 20 and the third lens element 30, an air gap G34 disposed between the third lens element 30 and the fourth lens element 40, an air gap G45 disposed between the fourth lens element 40 and the fifth lens element 50, an air gap G56 disposed between the fifth lens element 50 and the sixth lens element 60, an air gap G67 disposed between the sixth lens element 60 and the seventh lens element 70 as well as an air gap G78 disposed between the seventh lens element 70 and the eighth lens element 80. Therefore, the sum of seven air gaps from the first lens element 10 to the eighth lens element 80 along the optical axis I is AAG=G12+G23+G34+G45+G56+G67+G78.

In addition, a distance from the object-side surface 11 of the first lens element 10 to the image plane 91 along the optical axis I is TTL, namely a system length of the optical imaging lens 1; an effective focal length of the optical imaging lens element is EFL; a distance from the object-side surface 11 of the first lens element 10 to the image-side surface 82 of the eighth lens element 80 along the optical axis I is TL; HFOV stands for the half field of view which is half of the field of view of the entire optical imaging lens element system; ImgH is an image height of the optical imaging lens 1, and Fno is a f-number of the optical imaging lens 1.

When the filter 90 is placed between the eighth lens element 80 and the image plane 91, the air gap between the eighth lens element 80 and the filter 90 along the optical axis I is G8F; the thickness of the filter 90 along the optical axis I is TF; the air gap between the filter 90 and the image plane 91 along the optical axis I is GFP; and the distance from the image-side surface 82 of the eighth lens element 80 to the image plane 91 along the optical axis I is BFL. Therefore, BFL=G8F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a focal length of the seventh lens element 70 is f7; a focal length of the eighth lens element 80 is f8; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; a refractive index of the seventh lens element 70 is n7; a refractive index of the eighth lens element 80 is n8; an Abbe number of the first lens element 10 is v1; an Abbe number of the second lens element 20 is v2; an Abbe number of the third lens element 30 is v3; and an Abbe number of the fourth lens element 40 is v4; an Abbe number of the fifth lens element 50 is v5; an Abbe number of the sixth lens element 60 is v6; an Abbe number of the seventh lens element 70 is v7; and an Abbe number of the eighth lens element 80 is v8.

In the present invention, further defining: D21t42 is a distance from the object-side surface 21 of the second lens element 20 to the image-side surface of 42 the fourth lens element 40 along the optical axis I; D42t71 is a distance from the image-side surface 42 of the fourth lens element 40 to the object-side surface 71 of the seventh lens element 70 along the optical axis I; D61t82 is a distance from the object-side surface 61 of the sixth lens element 60 to the image-side surface 82 of the eighth lens element 80 along the optical axis I; AAG48 is a sum of four air gaps from the fourth lens element 40 to the eighth lens element 80 along the optical axis I, that is, the sum of G45, G56, G67 and G78.

First Embodiment

Figure 7A:
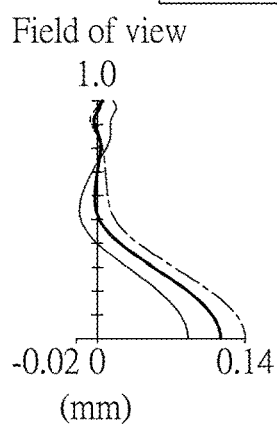
FIG. 7A illustrates the longitudinal spherical aberration on the image plane of the first embodiment.
Figure 7B:
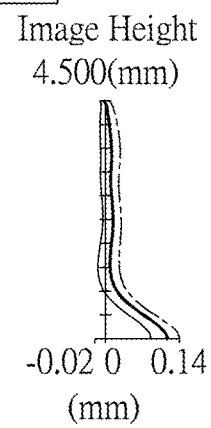
FIG. 7B illustrates the field curvature aberration on the sagittal direction of the first embodiment.
Figure 7C:
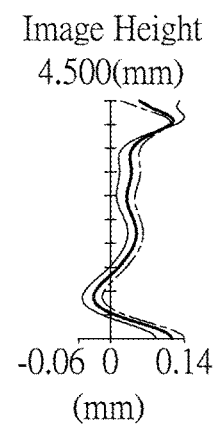
FIG. 7C illustrates the field curvature aberration on the tangential direction of the first embodiment.
Figure 7D:
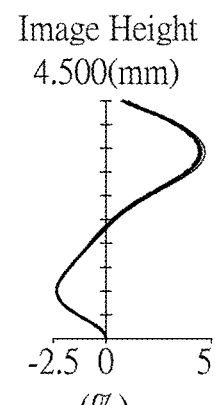
FIG. 7D illustrates the distortion of the first embodiment.

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the astigmatic field and the distortion in each embodiment stands for "image height" (ImgH), which is 4.500 mm.

The optical imaging lens 1 of the first embodiment exclusively has eight lens elements 10, 20, 30, 40, 50, 60, 70 and 80 with refracting power. The optical imaging lens 1 also has an aperture stop 99. The aperture stop 99 is provided between the first lens element 10 and the object side A1.

The first lens element 10 has positive refracting power. An optical axis region 13 of the object-side surface 11 of the first lens element 10 is convex, and a periphery region 14 of the object-side surface 11 of the first lens element 10 is convex. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has negative refracting power. An optical axis region 23 of the object-side surface 21 of the second lens element 20 is concave, and a periphery region 24 of the object-side surface 21 of the second lens element 20 is concave. An optical axis region 26 of the image-side surface 22 of the second lens element 20 is convex, and a periphery region 27 of the image-side surface 22 of the second lens element 20 is concave. Besides, both the object-side surface 21 and the image-side surface 22 of the second lens element 20 are aspheric surfaces, but it is not limited thereto.

The third lens element 30 has positive refracting power. An optical axis region 33 of the object-side surface 31 of the third lens element 30 is convex, and a periphery region 34 of the object-side surface 31 of the third lens element 30 is convex. An optical axis region 36 of the image-side surface 32 of the third lens element 30 is convex, and a periphery region 37 of the image-side surface 32 of the third lens element 30 is convex. Besides, both the object-side surface 31 and the image-side surface 32 of the third lens element 30 are aspheric surfaces, but it is not limited thereto.

The fourth lens element 40 has negative refracting power. An optical axis region 43 of the object-side surface 41 of the fourth lens element 40 is concave, and a periphery region 44 of the object-side surface 41 of the fourth lens element 40 is concave. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

The fifth lens element 50 has positive refracting power. An optical axis region 53 of the object-side surface 51 of the fifth lens element 50 is concave, and a periphery region 54 of the object-side surface 51 of the fifth lens element 50 is concave. An optical axis region 56 of the image-side surface 52 of the fifth lens element 50 is convex, and a periphery region 57 of the image-side surface 52 of the fifth lens element 50 is convex. Besides, both the object-side surface 51 and the image-side surface 52 of the fifth lens element 50 are aspheric surfaces, but it is not limited thereto.

The sixth lens element 60 has negative refracting power. An optical axis region 63 of the object-side surface 61 of the sixth lens element 60 is concave, and a periphery region 64 of the object-side surface 61 of the sixth lens element 60 is concave. An optical axis region 66 of the image-side surface 62 of the sixth lens element 60 is convex, and a periphery region 67 of the image-side surface 62 of the sixth lens element 60 is convex. Besides, both the object-side surface 61 and the image-side surface 62 of the sixth lens element 60 are aspheric surfaces, but it is not limited thereto.

The seventh lens element 70 has positive refracting power. An optical axis region 73 of the object-side surface 71 of the seventh lens element 70 is convex, and a periphery region 74 of the object-side surface 71 of the seventh lens element 70 is concave. An optical axis region 76 of the image-side surface 72 of the seventh lens element 70 is concave, and a periphery region 77 of the image-side surface 72 of the seventh lens element 70 is convex. Besides, both the object-side surface 71 and the image-side surface 72 of the seventh lens element 70 are aspheric surfaces, but it is not limited thereto.

The eighth lens element 80 has negative refracting power. An optical axis region 83 of the object-side surface 81 of the eighth lens element 80 is convex, and a periphery region 84 of the object-side surface 81 of the eighth lens element 80 is concave. An optical axis region 86 of the image-side surface 82 of the eighth lens element 80 is concave, and a periphery region 87 of the image-side surface 82 of the eighth lens element 80 is convex. Besides, both the object-side surface 81 and the image-side surface 82 of the eighth lens element 80 are aspheric surfaces, but it is not limited thereto.

In the first lens element 10, the second lens element 20, the third lens element 30, the fourth lens element 40, the fifth lens element 50, the sixth lens element 60, the seventh lens element 70 and the eighth lens element 80 of the optical imaging lens element 1 of the present invention, there are 16 surfaces, such as the object-side surfaces 11/21/31/41/51/61/71/81 and the image-side surfaces 12/22/32/42/52/62/72/82. If a surface is aspheric, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspheric surface (the perpendicular distance between the point of the aspheric surface at a distance Y from the optical axis and the tangent plane of the vertex on the optical axis of the aspheric surface);

Y represents a vertical distance from a point on the aspheric surface to the optical axis;

K is a conic constant; and $a_{2i}$ is the aspheric coefficient of the $2i^{th}$ order.

The optical data of the first embodiment of the optical imaging lens 1 are shown in FIG. 24 while the aspheric surface data are shown in FIG. 25. In the present embodiments of the optical imaging lens, the f-number of the entire optical imaging lens element system is Fno, EFL is the effective focal length, HFOV stands for the half field of view which is half of the field of view of the entire optical imaging lens element system, and the unit for the curvature radius, the thickness and the focal length is in millimeters (mm). In this embodiment, EFL=4.792 mm; HFOv=44.342 degrees; TTL=5.670 mm; Fno=1.690; ImgH=4.500 mm.

Second Embodiment

Figure 8:
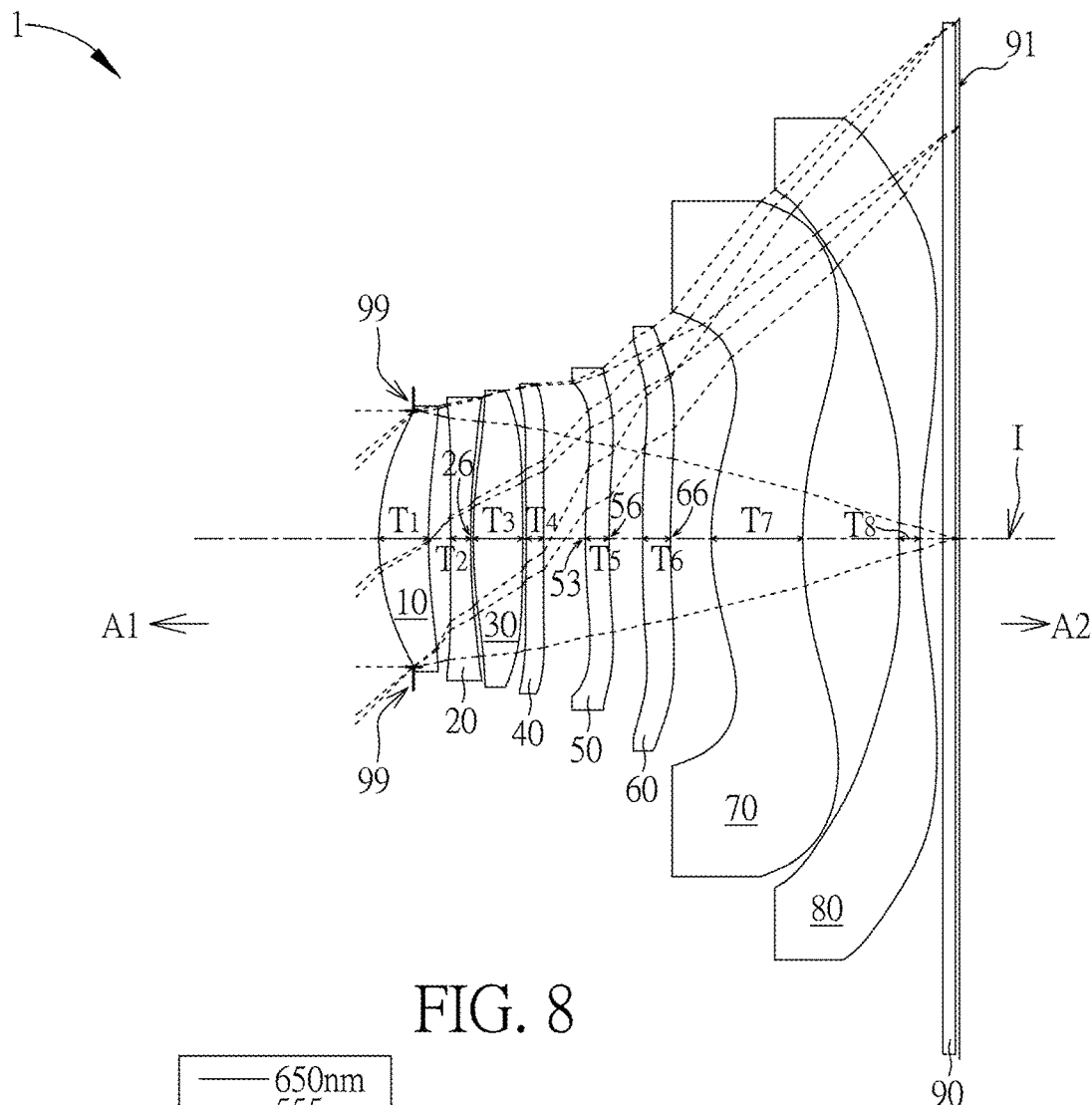
FIG. 8 illustrates a second embodiment of the optical imaging lens of the present invention.
Figures 9A, 9B, 9C, 9D:
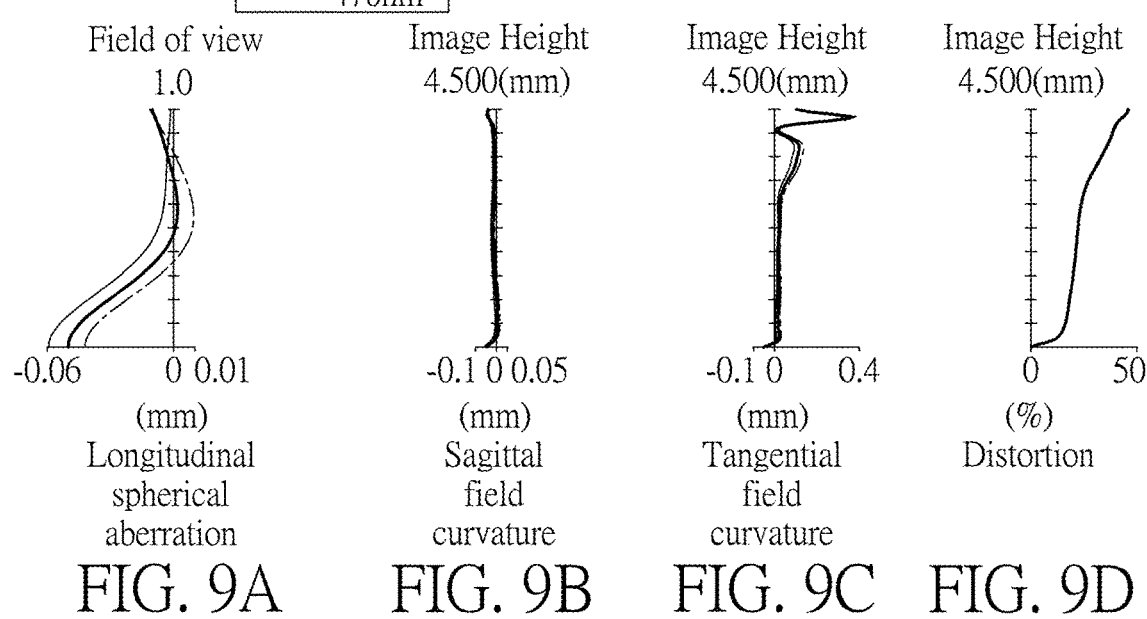
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the portion in a vicinity of the optical axis and the portion in a vicinity of its periphery will be omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 26 of the image-side surface 22 of the second lens element 20 is concave, the optical axis region 53 of the object-side surface 51 of the fifth lens element 50 is convex, the optical axis region 56 of the image-side surface 52 of the fifth lens element 50 is concave, the optical axis region 66 of the image-side surface 62 of the sixth lens element 60 is concave, the eighth lens element 80 has positive refracting power.

The optical data of the second embodiment of the optical imaging lens are shown in FIG. 26 while the aspheric surface data are shown in FIG. 27. In this embodiment, EFL=3.439 mm; HFOv=44.560 degrees; TTL=5.026 mm; Fno=1.550; ImgH=4.500 mm. In particular: (1) The system length of the optical imaging lens TTL in this embodiment is shorter than the system length of the optical imaging lens TTL in the first embodiment; (2) The HFOV in this embodiment is larger than the HFOV in the first embodiment; (3) The f-number in this embodiment is smaller than the f-number in the first embodiment; (4) The longitudinal spherical aberration in this embodiment is smaller than the longitudinal spherical aberration in the first embodiment; (5) The field curvature aberration on the sagittal direction in this embodiment is smaller than the field curvature aberration on the sagittal direction in the first embodiment.

Third Embodiment

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 26 of the image-side surface 22 of the second lens element 20 is concave, the optical axis region 53 of the object-side surface 51 of the fifth lens element 50 is convex, the optical axis region 56 of the image-side surface 52 of the fifth lens element 50 is concave, the optical axis region 66 of the image-side surface 62 of the sixth lens element 60 is concave.

The optical data of the third embodiment of the optical imaging lens are shown in FIG. 28 while the aspheric surface data are shown in FIG. 29. In this embodiment, EFL=3.597 mm; HFOv=44.483 degrees; TTL=5.147 mm; Fno=1.550; ImgH=4.500 mm. In particular: (1) The system length of the optical imaging lens TTL in this embodiment is shorter than the system length of the optical imaging lens TTL in the first embodiment; (2) The HFOV in this embodiment is larger than the HFOV in the first embodiment; (3) The f-number in this embodiment is smaller than the f-number in the first embodiment; (4) The longitudinal spherical aberration in this embodiment is smaller than the longitudinal spherical aberration in the first embodiment; (5) The field curvature aberration on the sagittal direction in this embodiment is smaller than the field curvature aberration on the sagittal direction in the first embodiment.

Fourth Embodiment

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 26 of the image-side surface 22 of the second lens element 20 is concave, the optical axis region 53 of the object-side surface 51 of the fifth lens element 50 is convex, the optical axis region 56 of the image-side surface 52 of the fifth lens element 50 is concave, the optical axis region 63 of the object-side surface 61 of the sixth lens element 60 is convex, the optical axis region 66 of the image-side surface 62 of the sixth lens element 60 is concave.

The optical data of the fourth embodiment of the optical imaging lens are shown in FIG. 30 while the aspheric surface data are shown in FIG. 31. In this embodiment, EFL=3.564 mm; HFOv=44.603 degrees; TTL=5.033 mm; Fno=1.550; ImgH=4.500 mm. In particular: (1) The system length of the optical imaging lens TTL in this embodiment is shorter than the system length of the optical imaging lens TTL in the first embodiment; (2) The HFOV in this embodiment is larger than the HFOV in the first embodiment; 3. The f-number in this embodiment is smaller than the f-number in the first embodiment; (4) The longitudinal spherical aberration in this embodiment is smaller than the longitudinal spherical aberration in the first embodiment; (5) The field curvature aberration on the sagittal direction in this embodiment is smaller than the field curvature aberration on the sagittal direction in the first embodiment.

Fifth Embodiment

Figure 14:
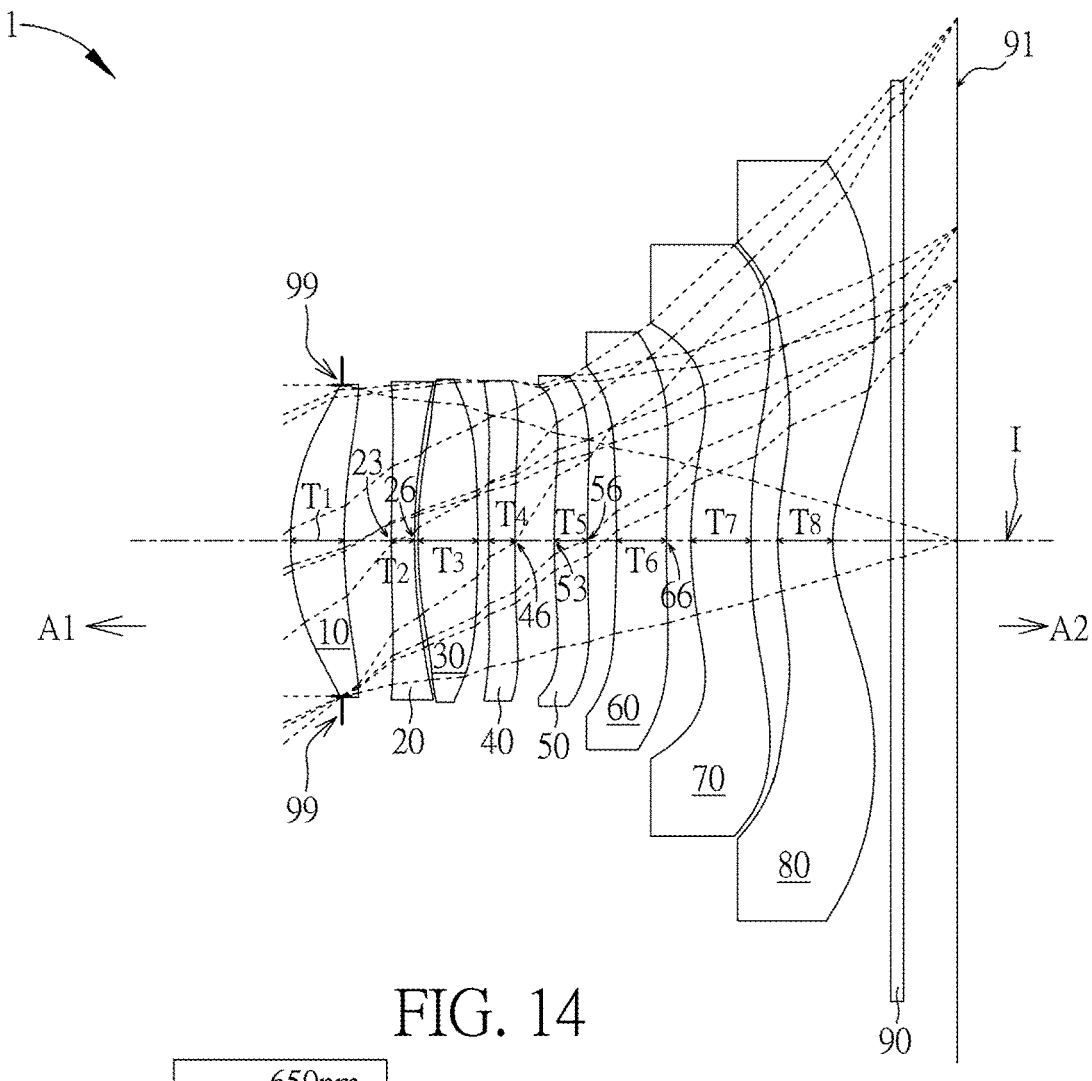
FIG. 14 illustrates a fifth embodiment of the optical imaging lens of the present invention.
Figures 15A, 15B, 15C, 15D:
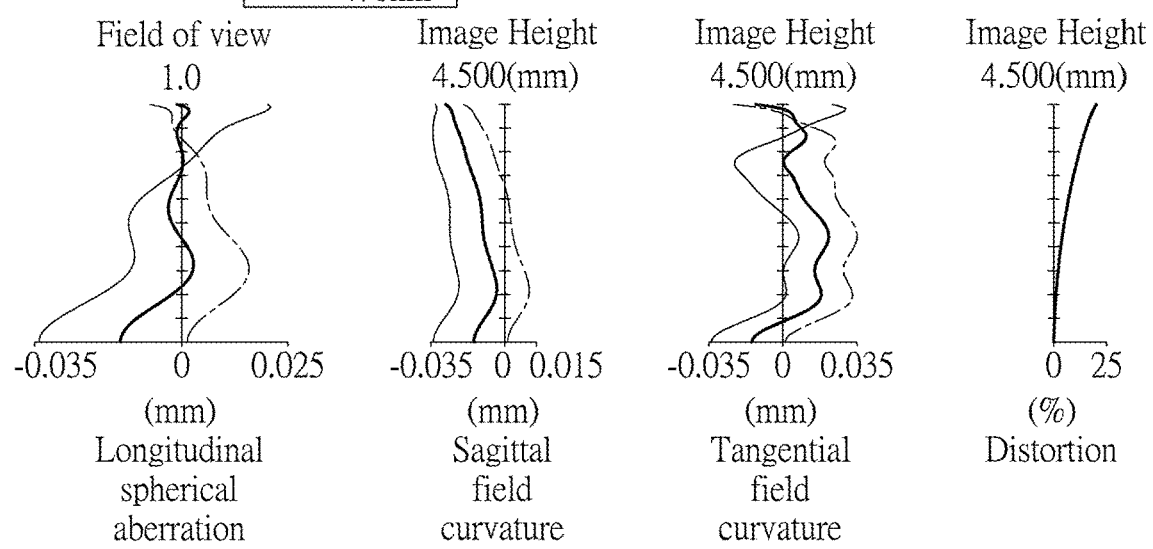
FIG. 15A illustrates the longitudinal spherical aberration on the image plane of the fifth embodiment.
FIG. 15B illustrates the field curvature aberration on the sagittal direction of the fifth embodiment.
FIG. 15C illustrates the field curvature aberration on the tangential direction of the fifth embodiment.
FIG. 15D illustrates the distortion of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 23 of the object-side surface 21 of the second lens element 20 is convex, the optical axis region 26 of the image-side surface 22 of the second lens element 20 is concave, the optical axis region 46 of the image-side surface 42 of the fourth lens element 40 is concave, the optical axis region 53 of the object-side surface 51 of the fifth lens element 50 is convex, the optical axis region 56 of the image-side surface 52 of the fifth lens element 50 is concave, the optical axis region 66 of the image-side surface 62 of the sixth lens element 60 is concave.

The optical data of the fifth embodiment of the optical imaging lens are shown in FIG. 32 while the aspheric surface data are shown in FIG. 33. In this embodiment, EFL=4.552 mm; HFOv=39.306 degrees; TTL=5.743 mm; Fno=1.700; ImgH=4.500 mm. In particular: (1) The longitudinal spherical aberration in this embodiment is smaller than the longitudinal spherical aberration in the first embodiment; (2) The field curvature aberration on the sagittal direction in this embodiment is smaller than the field curvature aberration on the sagittal direction in the first embodiment; (3) The field curvature aberration on the tangential direction in this embodiment is smaller than the field curvature aberration on the tangential direction in the first embodiment.

Sixth Embodiment

Figure 16:
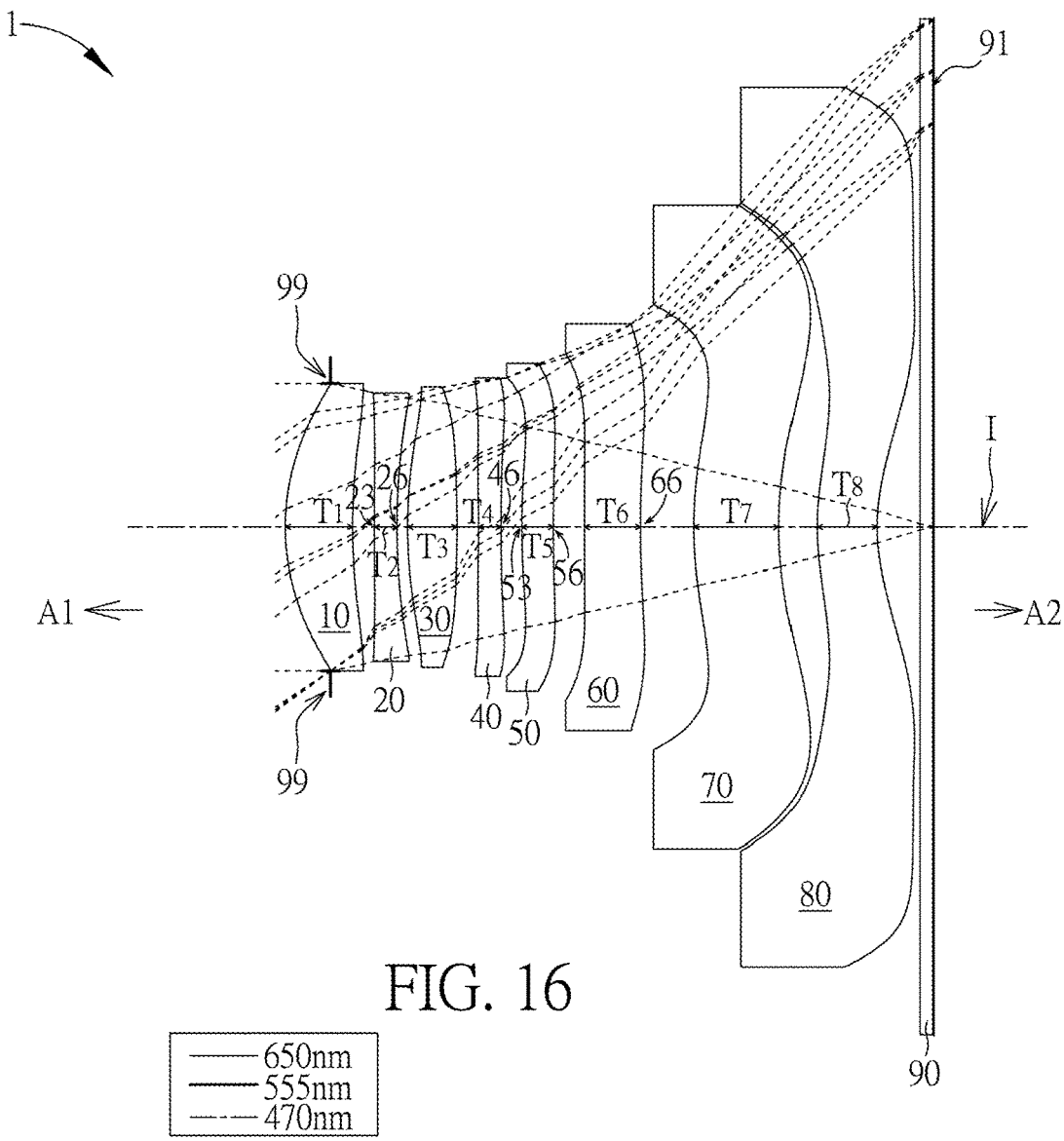
FIG. 16 illustrates a sixth embodiment of the optical imaging lens of the present invention.
Figure 17A:
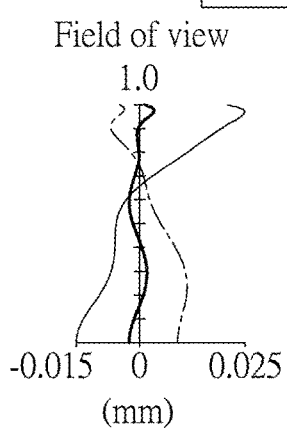
FIG. 17A illustrates the longitudinal spherical aberration on the image plane of the sixth embodiment.
Figure 17B:
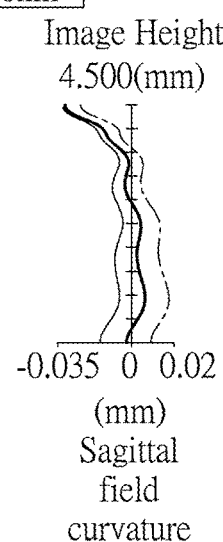
FIG. 17B illustrates the field curvature aberration on the sagittal direction of the sixth embodiment.
Figure 17C:
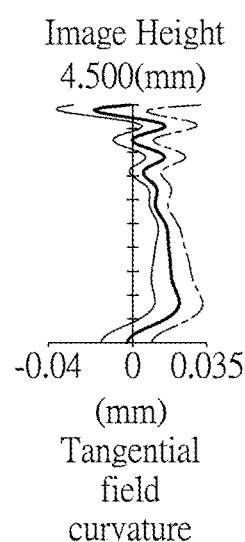
FIG. 17C illustrates the field curvature aberration on the tangential direction of the sixth embodiment.
Figure 17D:
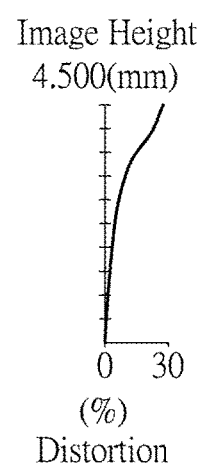
FIG. 17D illustrates the distortion of the sixth embodiment.

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 23 of the object-side surface 21 of the second lens element 20 is convex, the optical axis region 26 of the image-side surface 22 of the second lens element 20 is concave, the optical axis region 46 of the image-side surface 42 of the fourth lens element 40 is concave, the optical axis region 53 of the object-side surface 51 of the fifth lens element 50 is convex, the optical axis region 56 of the image-side surface 52 of the fifth lens element 50 is concave, the optical axis region 66 of the image-side surface 62 of the sixth lens element 60 is concave.

The optical data of the sixth embodiment of the optical imaging lens are shown in FIG. 34 while the aspheric surface data are shown in FIG. 35. In this embodiment, EFL=4.327 mm; HFOv=39.143 degrees; TTL=5.744 mm; Fno=1.700; ImgH=4.500 mm. In particular: (1) The longitudinal spherical aberration in this embodiment is smaller than the longitudinal spherical aberration in the first embodiment; (2) The field curvature aberration on the sagittal direction in this embodiment is smaller than the field curvature aberration on the sagittal direction in the first embodiment; (3) The field curvature aberration on the tangential direction in this embodiment is smaller than the field curvature aberration on the tangential direction in the first embodiment.

Seventh Embodiment

Figure 18:
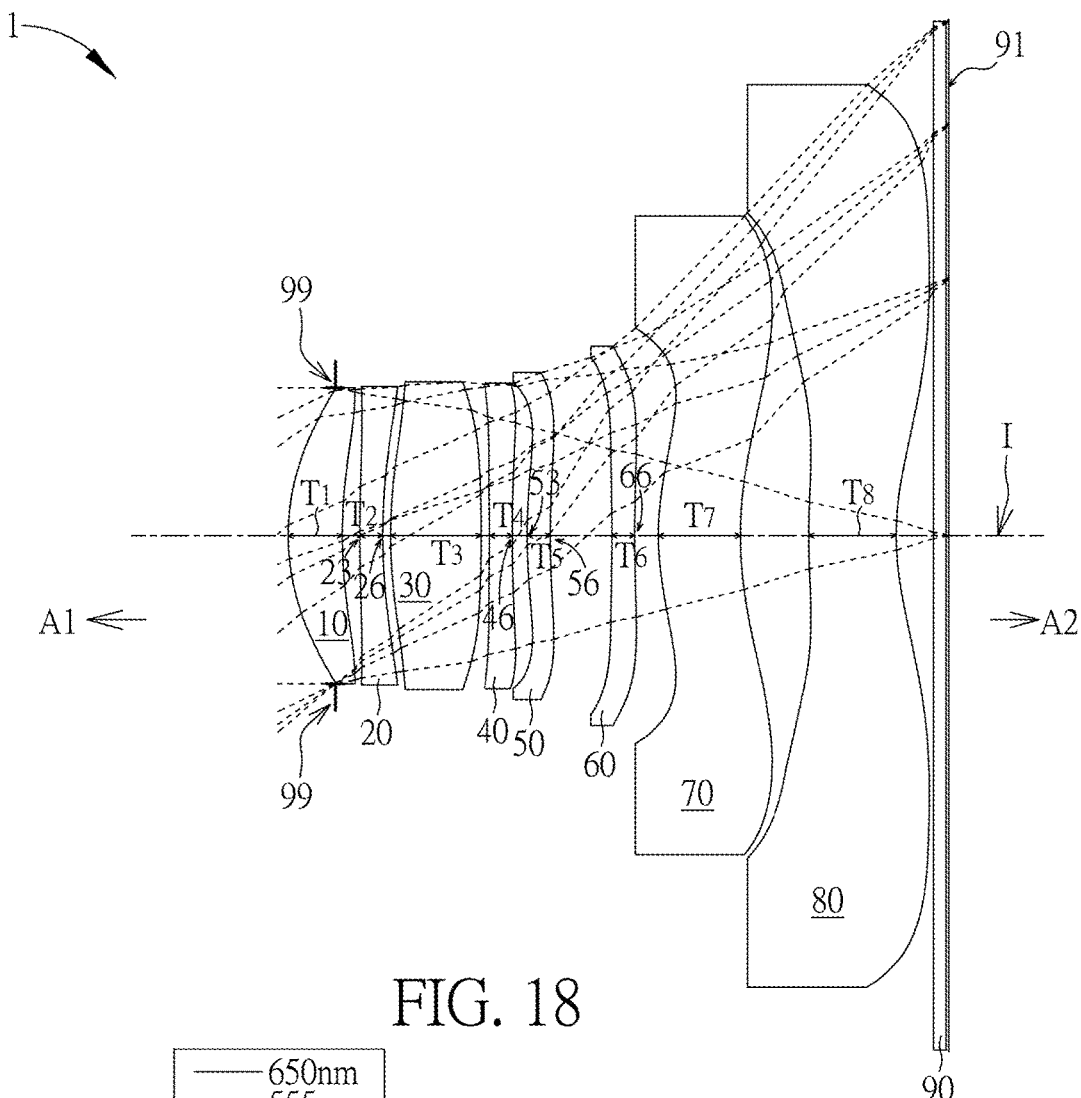
FIG. 18 illustrates a seventh embodiment of the optical imaging lens of the present invention.
Figures 19A, 19B, 19C, 19D:
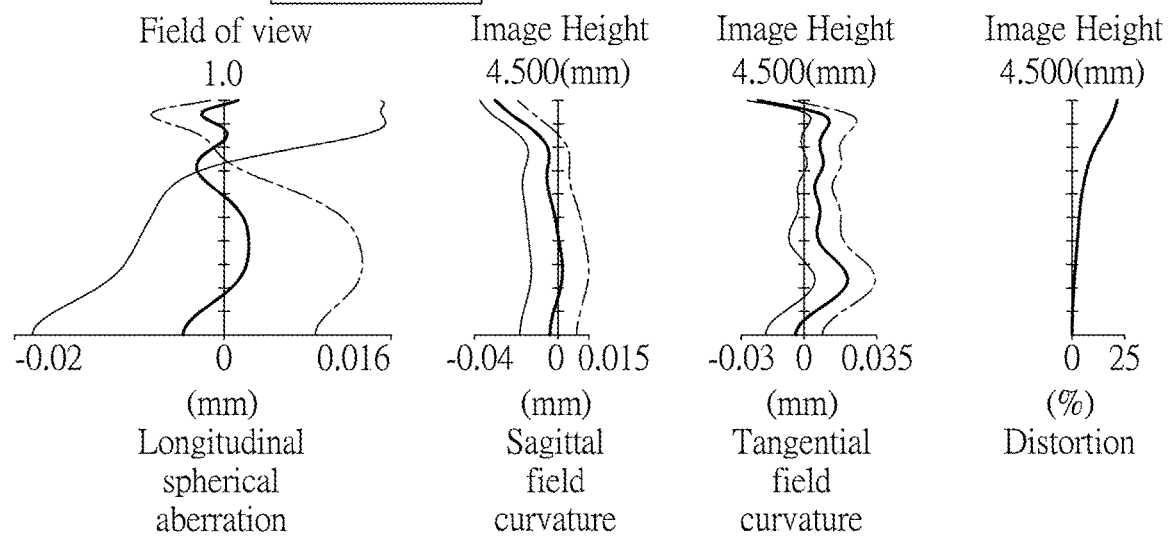
FIG. 19A illustrates the longitudinal spherical aberration on the image plane of the seventh embodiment.
FIG. 19B illustrates the field curvature aberration on the sagittal direction of the seventh embodiment.
FIG. 19C illustrates the field curvature aberration on the tangential direction of the seventh embodiment.
FIG. 19D illustrates the distortion of the seventh embodiment.

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 23 of the object-side surface 21 of the second lens element 20 is convex, the optical axis region 26 of the image-side surface 22 of the second lens element 20 is concave, the optical axis region 46 of the image-side surface 42 of the fourth lens element 40 is concave, the optical axis region 53 of the object-side surface 51 of the fifth lens element 50 is convex, the optical axis region 56 of the image-side surface 52 of the fifth lens element 50 is concave, the optical axis region 66 of the image-side surface 62 of the sixth lens element 60 is concave.

The optical data of the seventh embodiment of the optical imaging lens are shown in FIG. 36 while the aspheric surface data are shown in FIG. 37. In this embodiment, EFL=4.381 mm; HFOv=40.147 degrees; TTL=5.750 mm; Fno=1.700; ImgH=4.500 mm. In particular: (1) The longitudinal spherical aberration in this embodiment is smaller than the longitudinal spherical aberration in the first embodiment; (2) The field curvature aberration on the sagittal direction in this embodiment is smaller than the field curvature aberration on the sagittal direction in the first embodiment; (3) The field curvature aberration on the tangential direction in this embodiment is smaller than the field curvature aberration on the tangential direction in the first embodiment.

Eighth Embodiment

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 23 of the object-side surface 21 of the second lens element 20 is convex, the optical axis region 26 of the image-side surface 22 of the second lens element 20 is concave, the fourth lens element 40 has positive refracting power, the fifth lens element 50 has negative refracting power, the optical axis region 56 of the image-side surface 52 of the fifth lens element 50 is concave, the optical axis region 66 of the image-side surface 62 of the sixth lens element 60 is concave.

The optical data of the eighth embodiment of the optical imaging lens are shown in FIG. 38 while the aspheric surface data are shown in FIG. 39. In this embodiment, EFL=4.360 mm; HFOv=39.885 degrees; TTL=5.694 mm; Fno=1.700; ImgH=4.500 mm. In particular: (1) The longitudinal spherical aberration in this embodiment is smaller than the longitudinal spherical aberration in the first embodiment; (2) The field curvature aberration on the sagittal direction in this embodiment is smaller than the field curvature aberration on the sagittal direction in the first embodiment; (3) The field curvature aberration on the tangential direction in this embodiment is smaller than the field curvature aberration on the tangential direction in the first embodiment.

Ninth Embodiment

Figure 22:
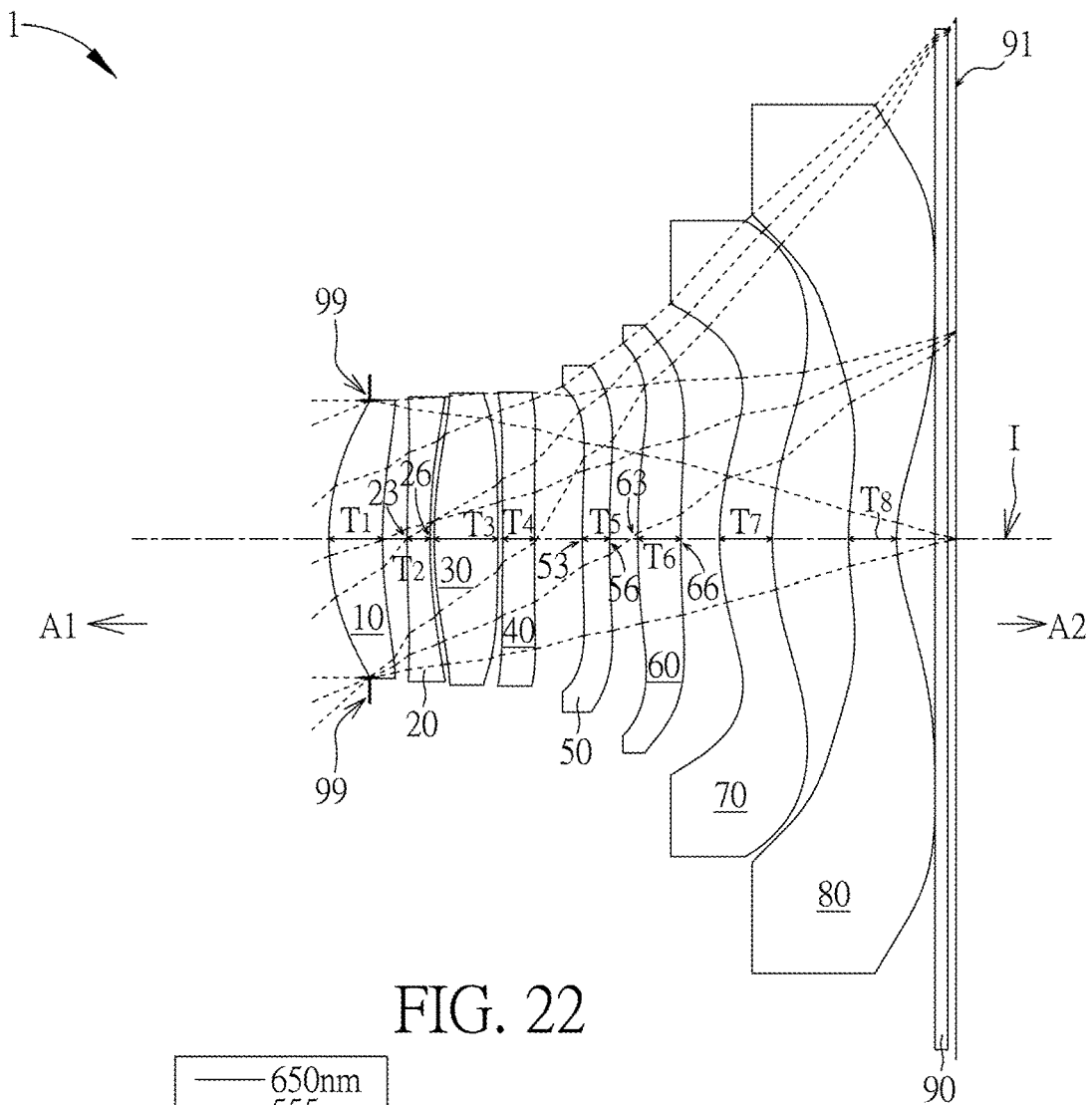
FIG. 22 illustrates a ninth embodiment of the optical imaging lens of the present invention.
Figures 23A, 23B, 23C, 23D:
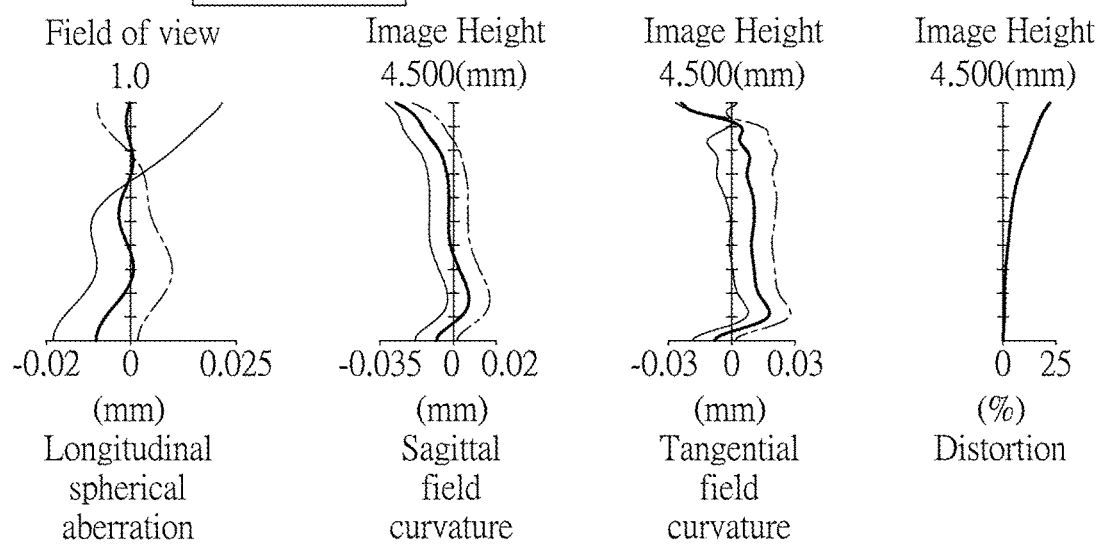
FIG. 23A illustrates the longitudinal spherical aberration on the image plane of the ninth embodiment.
FIG. 23B illustrates the field curvature aberration on the sagittal direction of the ninth embodiment.
FIG. 23C illustrates the field curvature aberration on the tangential direction of the ninth embodiment.
FIG. 23D illustrates the distortion of the ninth embodiment.

Please refer to FIG. 22 which illustrates the ninth embodiment of the optical imaging lens 1 of the present invention. Please refer to FIG. 23A for the longitudinal spherical aberration on the image plane 91 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the curvature radius, the lens thickness, the aspheric surface or the back focal length in this embodiment are different from the optical data in the first embodiment. Besides, in this embodiment, the optical axis region 23 of the object-side surface 21 of the second lens element 20 is convex, the optical axis region 26 of the image-side surface 22 of the second lens element 20 is concave, the fifth lens element 50 has negative refracting power, the optical axis region 53 of the object-side surface 51 of the fifth lens element 50 is convex, the optical axis region 56 of the image-side surface 52 of the fifth lens element 50 is concave, the sixth lens element 60 has positive refracting power, the optical axis region 63 of the object-side surface 61 of the sixth lens element 60 is convex, the optical axis region 66 of the image-side surface 62 of the sixth lens element 60 is concave.

The optical data of the ninth embodiment of the optical imaging lens are shown in FIG. 40 while the aspheric surface data are shown in FIG. 41. In this embodiment, EFL=4.080 mm; HFOv=41.957 degrees; TTL=5.430 mm; Fno=1.700; ImgH=4.500 mm. In particular: (1) The system length of the optical imaging lens TTL in this embodiment is shorter than the system length of the optical imaging lens TTL in the first embodiment; (2) The longitudinal spherical aberration in this embodiment is smaller than the longitudinal spherical aberration in the first embodiment; (3) The field curvature aberration on the sagittal direction in this embodiment is smaller than the field curvature aberration on the sagittal direction in the first embodiment; (4) The field curvature aberration on the tangential direction in this embodiment is smaller than the field curvature aberration on the tangential direction in the first embodiment.

Some important ratios in each embodiment are shown in FIG. 42.

Each embodiment of the present invention provides an optical imaging lens which has good imaging quality. For example, the following lens curvature configuration may effectively reduce the field curvature aberration and the distortion aberration to optimize the imaging quality of the optical imaging lens. Furthermore, the present invention has the corresponding advantages:

1. The optical imaging lens of the present invention satisfies that the first lens element has positive refracting power and the optical axis region of the object-side surface of the eighth lens element is convex. If the following conditions are satisfied at the same time, it is advantageous to increase the aperture and the image height while reducing the total system length:
   (1) The optical axis region of the image-side surface of the first lens element is concave, the second lens element has negative refracting power, the periphery region of the object-side surface of the second lens element is concave, and D61t82/D21t42≥1.750, and the preferable range is 1.750≤D61t82/D21t42≤3.000.
   (2) The periphery region of the image-side surface of the first lens element is concave, the periphery region of the image-side surface of the fourth lens element is convex, the periphery region of the object-side surface of the sixth lens element is concave, the seventh lens element has positive refracting power, and D61t82/D21t42≥2.000, and the preferable range is 2.000≤D61t82/D21t42≤3 0.000.
   (3) The optical axis region of the image-side surface of the first lens element is concave, the periphery region of the object-side surface of the second lens element is concave, the periphery region of the image-side surface of the third lens element is convex, and v1+v2+v3+v4+v5≤205.000, the preferable range is 130.000≤v1+v2+v3+v4+v5≤205.000.
2. The optical imaging lens of the present invention further satisfies the conditions of v4+v5≤70.100, v4≤35.000 and v7≥49.000, which is favorable for correcting the chromatic aberration of the optical imaging lens. And the preferable ranges are 30.000≤v4+v5≤70.100; 15.000≤v4≤35.000; 49.000≤v7≤60.000, when the condition of 30.000≤v4+v5≤60.000 is satisfied, the longitudinal spherical aberration can be further improved.

3. The optical imaging lens of the present invention further satisfies the following conditions, which is helpful to maintain the focal length and the optical parameters of the optical imaging lens in a proper value, to prevent any parameter from being too large to be unfavorable to the aberration correction of the overall optical imaging lens, or to prevent any parameter from being too small to affect assembly or to improve manufacturing difficulty:
EFL*Fno/ImgH≤1.800, and the preferable range is 1.000≤EFL*Fno/ImgH≤1.800.

4. The optical imaging lens of the present invention further satisfies the following conditions, which is helpful to maintain the thickness and spacing of each lens element at appropriate values, to prevent any parameter from being too large to be unfavorable to the overall thinning of the optical imaging lens, or to prevent any parameter from being too small to affect assembly or to improve manufacturing difficulty:

$TTL$/ImgH≤1.300, and the preferable range is
   1.000≤$TTL$/ImgH≤1.300;   (1)

$TL$*$Fno$/ImgH≤2.000, and the preferable range is
   1.500≤$TL$*$Fno$/ImgH≤2.000;   (2)

$ALT$/$AAG$≤2.000, and the preferable range is
   1.000≤$ALT$/$AAG$≤2.000;   (3)

($ALT$+$BFL$)/$AAG$48≤4.150, and the preferable range is 1.500≤($ALT$+$BFL$)/$AAG$48≤4.150;   (4)

$ALT$/($T3$+$T6$+$G12$)≤3.900, and the preferable range is 2.000≤$ALT$/($T3$+$T6$+$G12$)≤3.900;   (5)

($T1$+$T2$+$T5$+$G23$)/($T3$+$G45$)≤1.900, and the preferable range is 0.700≤($T1$+$T2$+$T5$+$G23$)/($T3$+$G45$)≤1.900;   (6)

($T1$+$T2$+$T5$+$G34$)/($T3$+$G56$)≤2.000, and the preferable range is 0.600≤($T1$+$T2$+$T5$+$G34$)/($T3$+$G56$)≤2.000;   (7)

($T1$+$T2$+$T5$+$G67$)/($T3$+$G78$)≤2.000, and the preferable range is 0.500≤($T1$+$T2$+$T5$+$G67$)/($T3$+$G78$)≤2.000;   (8)

($T7$+$T8$+$G23$)/($T4$+$G12$+$G45$)≤3.200, and the preferable range is 0.600≤($T7$+$T8$+$G23$)/($T4$+$G12$+$G45$)≤3.200;   (9)

($T7$+$T8$+$G34$)/($T4$+$G12$+$G56$)≤2.200, and the preferable range is 0.900≤($T7$+$T8$+$G34$)/($T4$+$G12$+$G56$)≤2.200;   (10)

($T7$+$T8$+$G67$)/($T4$+$G12$+$G78$)≤2.400, and the preferable range is 0.500≤($T7$+$T8$+$G67$)/($T4$+$G12$+$G78$)≤2.400;   (11)

$D42t71$/($T3$+$G12$)≤2.700, and the preferable range is 1.200≤$D42t71$/($T3$+$G12$)≤2.700; and   (12)

$D42t71$/($T3$+$G78$)≤2.200, and the preferable range is 0.600≤$D42t71$/($T3$+$G78$)≤2.200.   (13)

By observing three representative wavelengths of 470 nm, 555 nm and 650 nm in each embodiment of the present invention, it is suggested off-axis light of different heights of every wavelength all concentrates on the image plane, and deviations of every curve also reveal that off-axis light of different heights are well controlled so the embodiments do improve the spherical aberration, the astigmatic aberration and the distortion aberration. In addition, by observing the imaging quality data the distances amongst the three representing different wavelengths of 470 nm, 555 nm and 650 nm are pretty close to one another, which means the embodiments of the present invention are able to concentrate light of the three representing different wavelengths so that the aberration is greatly improved. Given the above, it is understood that the embodiments of the present invention provides outstanding imaging quality.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter total length of the optical imaging lens, a larger aperture available, better imaging quality or a better fabrication yield to overcome the drawbacks of prior art.

In addition to the above ratios, one or more conditional formulae may be optionally combined to be used in the embodiments of the present invention and the present invention is not limit to this. The curvatures of each lens element or multiple lens elements may be fine-tuned to result in more fine structures to enhance the performance or the resolution. The above limitations may be selectively combined in the embodiments without causing inconsistency.

The numeral value ranges within the maximum and minimum values obtained from the combination ratio relationships of the optical parameters disclosed in each embodiment of the invention can all be implemented accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens comprising a first lens element, a second lens element, a third lens element, a fourth lens element, a fifth lens element, a sixth lens element, a seventh lens element and an eighth lens element sequentially from an object side to an image side along an optical axis, each of the first lens element to the eighth lens element having an object-side surface facing toward the object side to allow imaging rays to pass through as well as an image-side surface facing toward the image side to allow the imaging rays to pass through, wherein:
   an optical axis region of the image-side surface of the third lens element is convex;
   an optical axis region of the object-side surface of the fourth lens element is concave, and a periphery region of the image-side surface of the fourth lens element is convex;
   an optical axis region of the image-side surface of the seventh lens element is concave;
   the eighth lens element has negative refracting power;
   the lens elements included by the optical imaging lens are only the eight lens elements described above,
   wherein the optical imaging lens satisfies the relationships:
   EFL*Fno/ImgH≤1.800, wherein EFL is an effective focal length of the optical imaging lens, Fno is a f-number of the optical imaging lens, ImgH is an image height of the optical imaging lens.

2. The optical imaging lens of claim 1, wherein T4 is a thickness of the fourth lens element along the optical axis, T7 is a thickness of the seventh lens element along the optical axis, T8 is a thickness of the eighth lens element along the optical axis, G12 is an air gap between the first lens element and the second lens element along the optical axis, G67 is an air gap between the sixth lens element and the seventh lens element along the optical axis, G78 is an air gap between the seventh lens element and the eighth lens element along the optical axis, and the optical imaging lens satisfies the relationship: (T7+T8+G67)/(T4+G12+G78) ≤2.400.

3. The optical imaging lens of claim 1, wherein ν7 is an Abbe number of the seventh lens element, and the optical imaging lens satisfies the relationship: 49.000≤ν7≤60.000.

4. The optical imaging lens of claim 1, wherein T4 is a thickness of the fourth lens element along the optical axis, T7 is a thickness of the seventh lens element along the optical axis, T8 is a thickness of the eighth lens element along the optical axis, G12 is an air gap between the first lens element and the second lens element along the optical axis, G34 is an air gap between the third lens element and the fourth lens element along the optical axis, G56 is an air gap between the fifth lens element and the sixth lens element along the optical axis, and the optical imaging lens satisfies the relationship: (T7+T8+G34)/(T4+G12+G56)≤2.200.

5. The optical imaging lens of claim 1, wherein T1 is a thickness of the first lens element along the optical axis, T2 is a thickness of the second lens element along the optical axis, T3 is a thickness of the third lens element along the optical axis, T5 is a thickness of the fifth lens element along the optical axis, G34 is an air gap between the third lens element and the fourth lens element along the optical axis, G56 is an air gap between the fifth lens element and the sixth lens element along the optical axis, and the optical imaging lens satisfies the relationship: (T1+T2+T5+G34)/(T3+G56) ≤2.000.

6. The optical imaging lens of claim 1, wherein T4 is a thickness of the fourth lens element along the optical axis, T7 is a thickness of the seventh lens element along the optical axis, T8 is a thickness of the eighth lens element along the optical axis, G12 is an air gap between the first lens element and the second lens element along the optical axis, G23 is an air gap between the second lens element and the third lens element along the optical axis, G45 is an air gap between the fourth lens element and the fifth lens element along the optical axis, and the optical imaging lens satisfies the relationship: (T7+T8+G23)/(T4+G12+G45)≤3.200.

7. The optical imaging lens of claim 1, wherein D61t82 is a distance from the object-side surface of the sixth lens element to the image-side surface of the eighth lens element along the optical axis, D21t42 is a distance from the object-side surface of the second lens element to the image-side surface of the fourth lens element along the optical axis, and the optical imaging lens satisfies the relationship: D61t82/D21t42≥2.000.

8. The optical imaging lens of claim 1,
a periphery region of the image-side surface of the sixth lens element is convex;
an optical axis region of the object-side surface of the eighth tens element is convex.

9. The optical imaging lens of claim 1, wherein T3 is a thickness of the third lens element along the optical axis, G78 is an air gap between the seventh lens element and the eighth lens element along the optical axis, D42t71 is a distance from the image-side surface of the fourth lens element to the object-side surface of the seventh lens element along the optical axis, and the optical imaging lens satisfies the relationship: D42t71/(T3+G78)≤2.200.

10. The optical imaging lens of claim 1, wherein T3 is a thickness of the third lens element along the optical axis, G12 is an air gap between the first lens element and the second lens element along the optical axis, D42t71 is a distance from the image-side surface of the fourth lens element to the object-side surface of the seventh lens element along the optical axis, and the optical imaging lens satisfies the relationship: D42t71/(T3+G12)≤2.700.

11. The optical imaging lens of claim 1, wherein μ4 is an Abbe number of the fourth lens element, and the optical imaging lens satisfies the relationship: ν4≤35.000.

12. The optical imaging lens of claim 1, wherein ALT is a sum of the thicknesses of eight lens elements from the first lens element to the eighth lens element along the optical axis, BFL is a distance from the image-side surface of the eighth lens element to an image plane along the optical axis, AAG48 is a sum of four air gaps from the fourth lens element to the eighth lens element along the optical axis, and the optical imaging lens satisfies the relationship: (ALT+BFL)/AAG48≤4.150.

13. The optical imaging lens of claim 1, wherein D61t82 is a distance from the object-side surface of the sixth lens element to the image-side surface of the eighth lens element along the optical axis, D21t42 is a distance from the object-side surface of the second lens element to the image-side surface of the fourth lens element along the optical axis, and the optical imaging lens satisfies the relationship: D61t82/D21t42≥1.750.

14. The optical imaging lens of claim 1, wherein T1 is a thickness of the first lens element along the optical axis, T2 is a thickness of the second lens element along the optical axis, T3 is a thickness of the third lens element along the optical axis, T5 is a thickness of the fifth lens element along the optical axis, G23 is an air gap between the second lens element and the third lens element along the optical axis, G45 is an air gap between the fourth lens element and the fifth lens element along the optical axis, and the optical imaging lens satisfies the relationship: (T1+T2+T5+G23)/(T3+G45)≤1.900.

15. The optical imaging lens of claim 1,
an optical axis region of the image-side surface of the fourth lens element is convex;
a periphery region of the image-side surface of the fifth lens element is convex;
an optical axis region of the image-side surface of the sixth lens element is concave.

16. The optical imaging lens of claim 1, wherein T1 is a thickness of the first lens element along the optical axis, T2 is a thickness of the second lens element along the optical axis, T3 is a thickness of the third lens element along the optical axis, T5 is a thickness of the fifth lens element along the optical axis, G67 is an air gap between the sixth lens element and the seventh lens element along the optical axis, G78 is an air gap between the seventh lens element and the eighth lens element along the optical axis, and the optical imaging lens satisfies the relationship: (T1+T2+T5+G67)/(T3+G78)≤2.000.

17. The optical imaging lens of claim 1, wherein TL is a distance from the object-side surface of the first lens element to the image-side surface of the eighth lens element along the optical axis, and the optical imaging lens satisfies the relationship: TL*Fno/ImgH≤2.000.

18. The optical imaging lens of claim 1, wherein TTL is the distance from the object-side surface of the first lens element to an imaging plane along the optical axis, and the optical imaging lens satisfies the relationship: TTL/ImgH≤1.300.

19. The optical imaging lens of claim 1, wherein v4 is an Abbe number of the fourth lens element, v5 is an Abbe number of the fifth lens element, and the optical imaging lens satisfies the relationship: v4+v5≤70.100.

20. The optical imaging lens of claim 1, wherein ALT is a sum of the thicknesses of eight lens elements from the first lens element to the eighth lens element along the optical axis, AAG is a sum of seven air gaps from the first lens element to the eighth lens element along the optical axis, and the optical imaging lens satisfies the relationship: ALT/AAG≤2.000.

* * * * *